(12) United States Patent
Vallance et al.

(10) Patent No.: US 11,217,098 B2
(45) Date of Patent: Jan. 4, 2022

(54) SMART BUILDING MANAGEMENT SUITE USING ROBOT COMMAND AND CONTROL

(71) Applicant: CDW LLC, Vernon Hills, IL (US)

(72) Inventors: Colin R. Vallance, Chicago, IL (US); Michael Alan Robinson, Clinton, OH (US); Forrest Weinberg, Northridge, CA (US); Sankar Nair, Federal Way, WA (US)

(73) Assignee: CDW LLC, Vernon Hills, IL (US)

( * ) Notice: Subject to any disclaimer, the term of this patent is extended or adjusted under 35 U.S.C. 154(b) by 0 days.

(21) Appl. No.: 16/923,859

(22) Filed: Jul. 8, 2020

(65) Prior Publication Data
US 2021/0295693 A1    Sep. 23, 2021

Related U.S. Application Data

(63) Continuation of application No. 16/823,849, filed on Mar. 19, 2020, now Pat. No. 10,789,846.

(51) Int. Cl.
*B60Q 1/48* (2006.01)
*G08G 1/14* (2006.01)
*G06N 20/00* (2019.01)
*G06Q 10/02* (2012.01)
*G08G 1/04* (2006.01)
(Continued)

(52) U.S. Cl.
CPC ......... *G08G 1/146* (2013.01); *G06K 9/00785* (2013.01); *G06N 20/00* (2019.01); *G06Q 10/02* (2013.01); *G08G 1/04* (2013.01); *G08G 1/142* (2013.01); *H04W 68/005* (2013.01); *G06K 2209/23* (2013.01)

(58) Field of Classification Search
CPC .......... G08G 1/146; G08G 1/142; G08G 1/04; G06K 9/00785; G06K 2209/23; G06N 20/00; G06Q 10/02; H04W 68/005
See application file for complete search history.

(56) References Cited

U.S. PATENT DOCUMENTS

| | | |
|---|---|---|
| 8,816,880 B1 | 8/2014 | Foster |
| 9,589,466 B2 | 3/2017 | Huang |

(Continued)

OTHER PUBLICATIONS

International Application No. PCT/US2020/041759, International Search Report and Written Opinion, dated Sep. 17, 2020.

(Continued)

*Primary Examiner* — Toan N Pham
(74) *Attorney, Agent, or Firm* — Marshall, Gerstein & Borun LLP

(57) ABSTRACT

A computer-implemented method includes displaying a bot client application including an active channel indicator, receiving bot input, analyzing the bot input, generating an output, and displaying the output. A smart building system includes a processor and a memory storing instructions that, when executed by the one or more processors, cause the system to display a bot client application including an active channel indicator, receive bot input, analyze the bot input, generate an output, and display the output. A non-transitory computer readable medium containing program instructions that when executed, cause a computer to display a bot client application including an active channel indicator, receive bot input, analyze the bot input, generate an output, and display the output.

20 Claims, 33 Drawing Sheets

(51) Int. Cl.
*G06K 9/00* (2006.01)
*H04W 68/00* (2009.01)

(56) References Cited

U.S. PATENT DOCUMENTS

| | | | |
|---|---|---|---|
| 10,198,949 B2 | 2/2019 | Becker | |
| 10,789,846 B1 | 9/2020 | Vallance et al. | |
| 2016/0132614 A1* | 5/2016 | Eiynk | F24F 11/30 |
| | | | 707/722 |
| 2017/0148324 A1 | 5/2017 | High et al. | |
| 2017/0323227 A1 | 11/2017 | Sadeghi | |
| 2020/0251111 A1* | 8/2020 | Temkin | G06F 16/2423 |
| 2021/0082064 A1* | 3/2021 | Briffa | H04N 7/181 |

OTHER PUBLICATIONS

U.S. Appl. No. 16/923,698, filed Jul. 8, 2020, Colin R. Valiance et al.
U.S. Appl. No. 16/923,979, filed Jul. 8, 2020, Colin R. Valiance et al.
U.S. Appl. No. 16/923,996, filed Jul. 8, 2020, Colin R. Valiance et al.
U.S. Appl. No. 16/924,019, filed Jul. 8, 2020, Colin R. Valiance et al.
U.S. Appl. No. 16/924,062, filed Jul. 8, 2020, Colin R. Valiance et al.

* cited by examiner e-Receptionist

[Home] [Refresh]

| # | Full Name | Visiting Person | SignIn Status | Checkin Time | Image |
|---|---|---|---|---|---|
| 2 | bill spears | joe ebert | SignOut | Mon Sep 09 2019 12:34:34 GMT -700 (PDT) |  |
| 6 | ida bell | dorothy nelson | SignOut | Mon Sep 09 2019 22:11:13 GMT -700 (PDT) |  |
| 7 | hariet tuber | kristin hebert | SignOut | Mon Sep 09 2019 14:11:40 GMT -700 (PDT) |  |
| 8 | ida bell | dorothy nelson | SignOut | Mon Sep 09 2019 12:23:02 GMT -700 (PDT) |  |
| 9 | bill spears | pamela garrett | | Mon Sep 09 2019 23:19:17 GMT -700 (PDT) |  |

| # | Full Name | Visiting Person | SignIn Status | Checkin Time | Image |
|---|---|---|---|---|---|
| 2 | bill spears | joe ebert | SignOut | Mon Sep 09 2019 12:34:34 GMT -700 (PDT) | |

Room Presence

Here you will find a listing of rooms and availability.

| # | Room Name | People Present | People Count | Call Status | Controls |
|---|---|---|---|---|---|
| 1 | SpaceXRoom | Yes | 1 | On a call | Show Map |
| 1 | TheGarage | No | -1 | Idle | Show Map |

602

Refresh Data

Lighting Control

Click below to see a list of your rooms

700

SMART BUILDING MANAGEMENT SUITE USING ROBOT COMMAND AND CONTROL

CROSS-REFERENCE TO RELATED APPLICATIONS

This application is a continuation of U.S. patent application Ser. No. 16/823,849, now U.S. Pat. No. 10,789,846, entitled AVAILABLE VEHICLE PARKING SPACE DISPATCH, and filed on Mar. 19, 2020, which is incorporated herein by reference in its entirety.

TECHNICAL FIELD

The present disclosure is generally directed to methods and systems for performing building automation, and more particularly, to techniques smart building management using robot command and control.

BACKGROUND

Building management is complicated, as buildings conventionally lack automation. As a result, building owners see significant costs associated with a variety of problems relating to the physical infrastructure of the building. For example, visitors who are unfamiliar with the building may have difficulty locating building tenants. Visitors and tenants have difficulty locating parking spots (e.g., for electric vehicles) and finding office locations (e.g., conference rooms). Tenants may leave electric lighting on at times when rooms are unoccupied, relating in higher costs and wasting power. Further, conventional building security is not sufficient.

Technology-focused companies increasingly deploy communications platforms (e.g., Slack, Microsoft Teams, Cisco Webex, etc.) in their organizations, and users are increasingly integrating such platforms into their daily workflows. However, conventional communications platforms lack building management functionality.

BRIEF SUMMARY

In one aspect a computer-implemented method for smart building management using robot command and control includes displaying, via a graphical user interface, a building automation bot client application including an input field, an output field and a plurality of channels, wherein one of the channels includes an active channel indicator. The method may include receiving, via the input field, bot input from a user, analyzing the bot input from the user using a trained machine learning model to identify a bot instruction and one or more bot parameters, generating an output by analyzing the bot instruction to identify a user intent and performing building automation task associated with the intent; and displaying the output in the output field of the building automation bot client application.

In another aspect a smart building management system includes one or more processors, and a memory storing instructions that, when executed by the one or more processors, cause the system to display, via a graphical user interface, a building automation bot client application including an input field, an output field and a plurality of channels, wherein one of the channels includes an active channel indicator. The memory may store further instructions that when executed by the one or more processors cause the system to receive, via the input field, bot input from a user, analyze the bot input from the user using a trained machine learning model to identify a bot instruction and one or more bot parameters, generate an output by analyzing the bot instruction to identify a user intent and performing building automation task associated with the intent; and display the output in the output field of the building automation bot client application.

In yet another aspect, a non-transitory computer readable medium includes program instructions that when executed, cause a computer to display, via a graphical user interface, a building automation bot client application including an input field, an output field and a plurality of channels, wherein one of the channels includes an active channel indicator. The non-transitory computer readable medium may include further instructions that when executed, cause a computer to receive, via the input field, bot input from a user, analyze the bot input from the user using a trained machine learning model to identify a bot instruction and one or more bot parameters, generate an output by analyzing the bot instruction to identify a user intent and performing building automation task associated with the intent; and display the output in the output field of the building automation bot client application.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3H depicts exemplary building automation registration log data, according to one embodiment.

FIG. 6A depicts exemplary data logs for tracking room presence, according to an embodiment.

Figure 1:
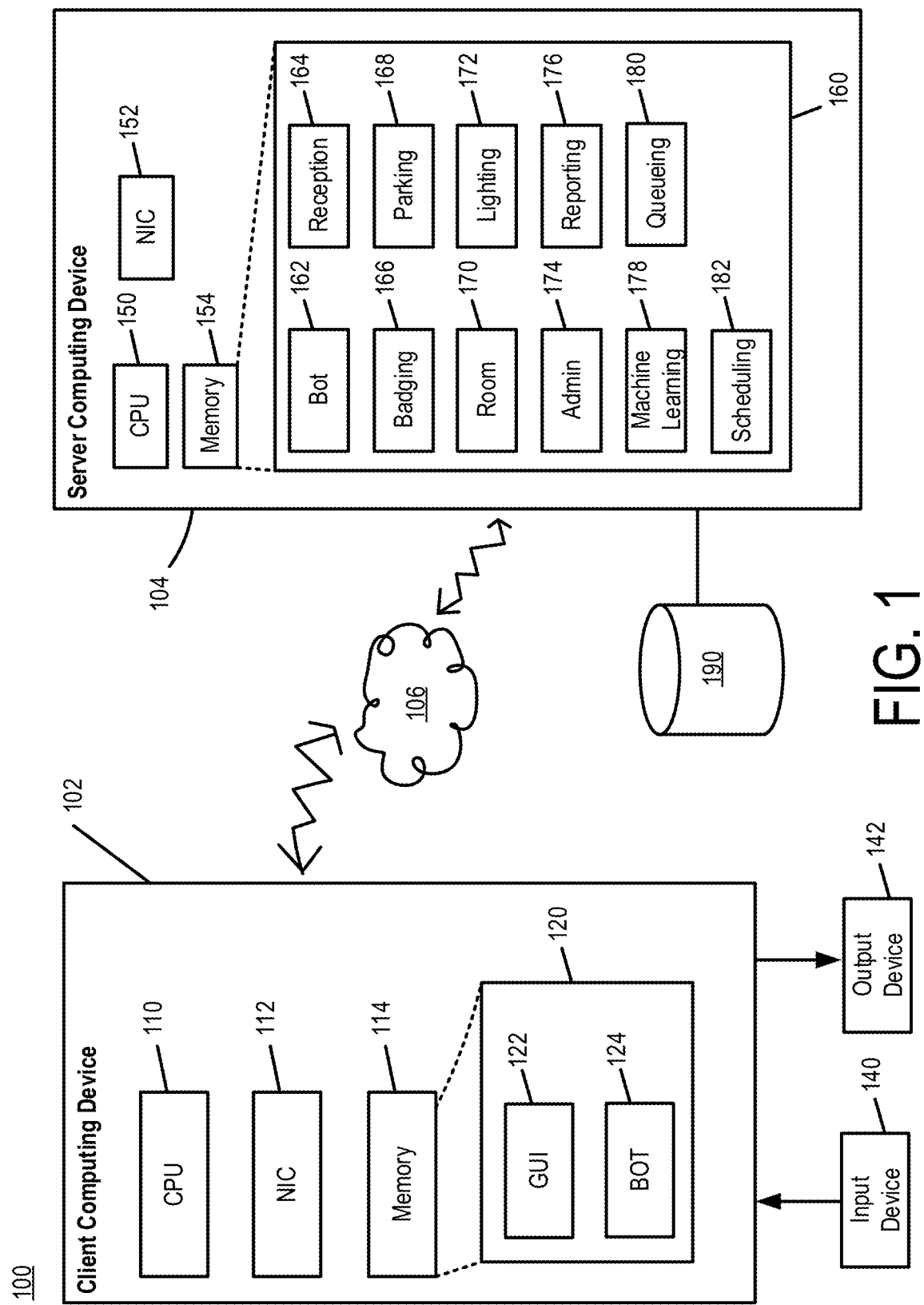
FIG. 1 depicts an exemplary computing environment in which methods and systems for performing building automation may be implemented, according to one embodiment.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The present techniques provide methods and systems for, inter alia, managing aspects of buildings (e.g., an office building). For example, the present techniques include aspects of building management such as visitor registration/reception, security badging, parking spot identification/allocation (e.g., for an electric vehicle), room presence techniques, lighting control techniques, and administration and reporting techniques. The present techniques improve upon conventional buildings by adding automated technological capabilities to enhance building management.

It should be appreciated that the present techniques may be used to manage one or more physical building structure simultaneously, whether the structures are physically joined or not. For example, a hotel may have a plurality of locations including hotel rooms, a lobby, a bar, a pool, and several conference rooms. For example, the conference rooms may be detached from the lobby in one or more separate structures. In such cases, for purposes of the present disclosure, the "building" may refer to the collection locations, whether strictly part of the same physical structure or not. In some embodiments, disparate physical structures (e.g., two data centers in different states) may be considered part of the same building management embodiment, wherein the disparate structures are linked by a computer network.

The present techniques may utilize machine learning (ML) technologies, computer vision (CV) and/or artificial intelligence (AI) to create a modern automated workplace. For example, in some embodiments, the present techniques provide automated visitor check-in, notifications, three-factor door security, electric vehicle (EV) parking spot locating and dispatch, conference room light controls, conference room delegation, and reporting in one or more graphical user interface (GUI). Some embodiments include a bot interface and/or backend module.

The present techniques leverage modern technology to automate mundane tasks associated with operating an office building. For example, the present techniques eliminate the need for building personnel to turn lights off at night, to adjust heating and cooling, and/or to ensure that doors are locked. Further, a receptionist is no longer needed to check in a visitor or to locate an available conference room. The present techniques may determine the status of parking spaces in real time and dispatch spaces to users. By automating building management tasks, building owners will see significant cost and resource savings, building occupants may locate an EV parking spot or finding a conference room, and visitors may seamlessly enter the building environment. Building security is significantly improved by adding multi-factor authentication that may be configured to use more or fewer factors depending on the desired security level of the room or area. The present techniques enable visitor badge management and automated kiosk-based check in, and automatic rule-based conference room allocation.

The present techniques improve over conventional chat platforms, which lack any building automation functionality, by providing users with rich functionality for accessing and/or controlling important aspects of building management (e.g., access to office information, control of room lighting, etc.) using an interface (e.g., a chat bot) that users are already familiar with. Additional benefits over conventional techniques include simple to use interfaces that provide quick and easy access to building information for building administrators, employees and customers. By automating tasks, the present techniques provide a uniform user experience while improving consistency and reducing errors. The present techniques reimagine how important aspects of office buildings are managed using modern technologies.

Exemplary Computing Environment

FIG. 1 depicts an exemplary computing environment 100 in which the techniques disclosed herein may be implemented, according to an embodiment. The environment 100 includes a client computing device 102, a server 104, and a network 106. Some embodiments may include a plurality of client computing devices 102 and/or a plurality of servers 104.

The client computing device 102 may be an individual server, a group (e.g., cluster) of multiple servers, or another suitable type of computing device or system (e.g., a collection of computing resources). For example, the client computing device 102 may be any suitable computing device (e.g., a server, a mobile computing device, a smart phone, a tablet, a laptop, a wearable device, etc.). In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.).

Figure 4A:
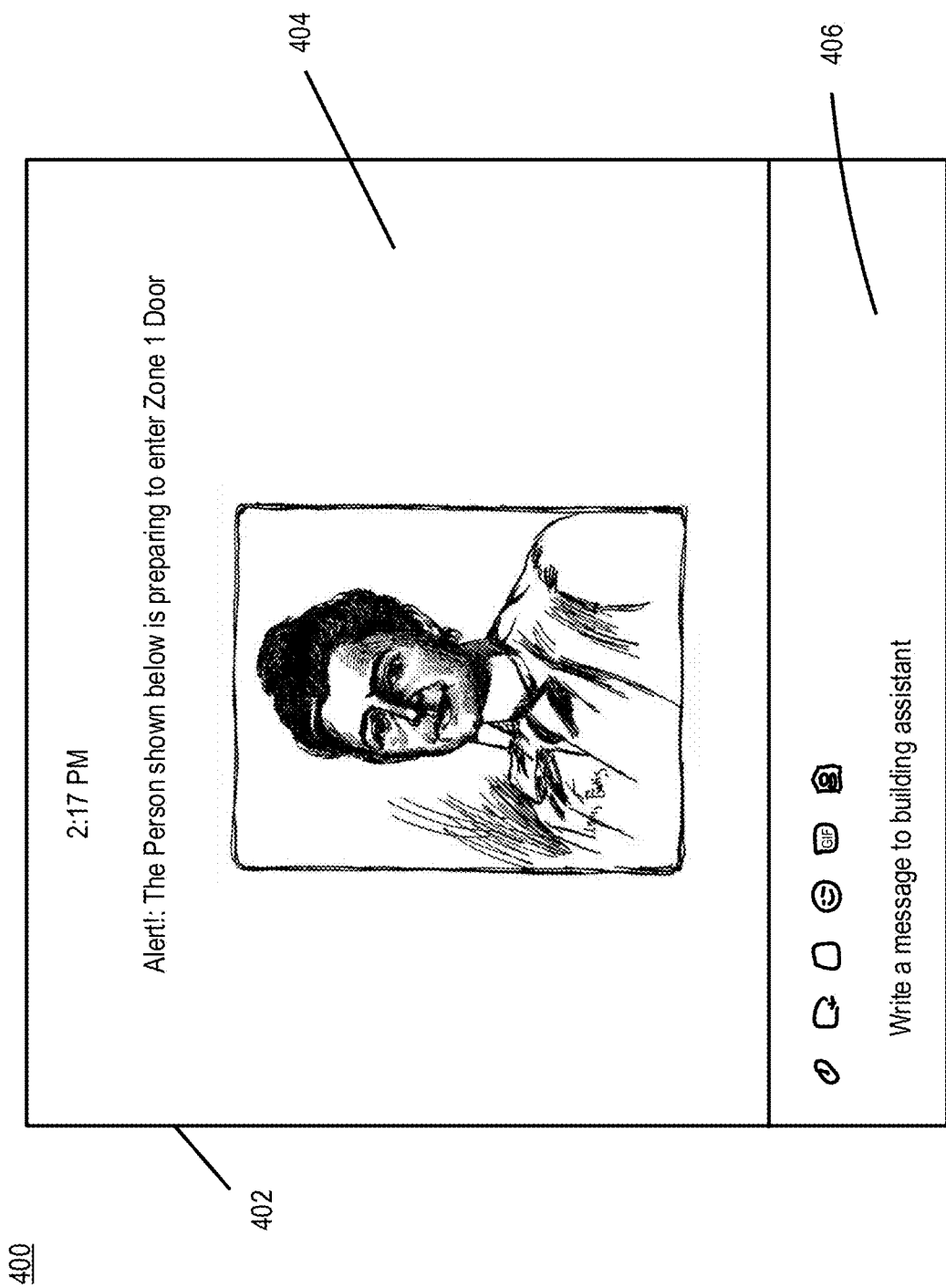
FIG. 4A depicts exemplary building automation motion detection notification, according to one embodiment.
Figure 4B:
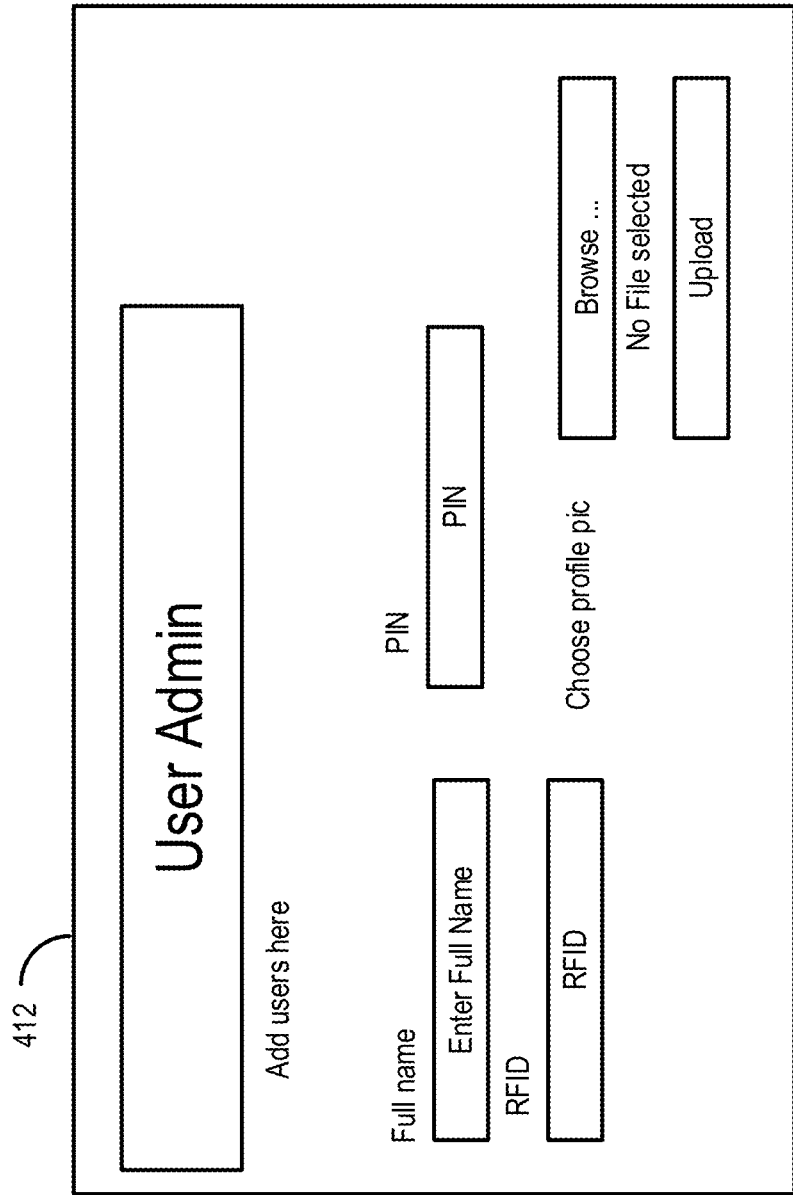
FIG. 4B depicts exemplary building automation badge registration graphical user interface, according to one embodiment.
Figure 4C:
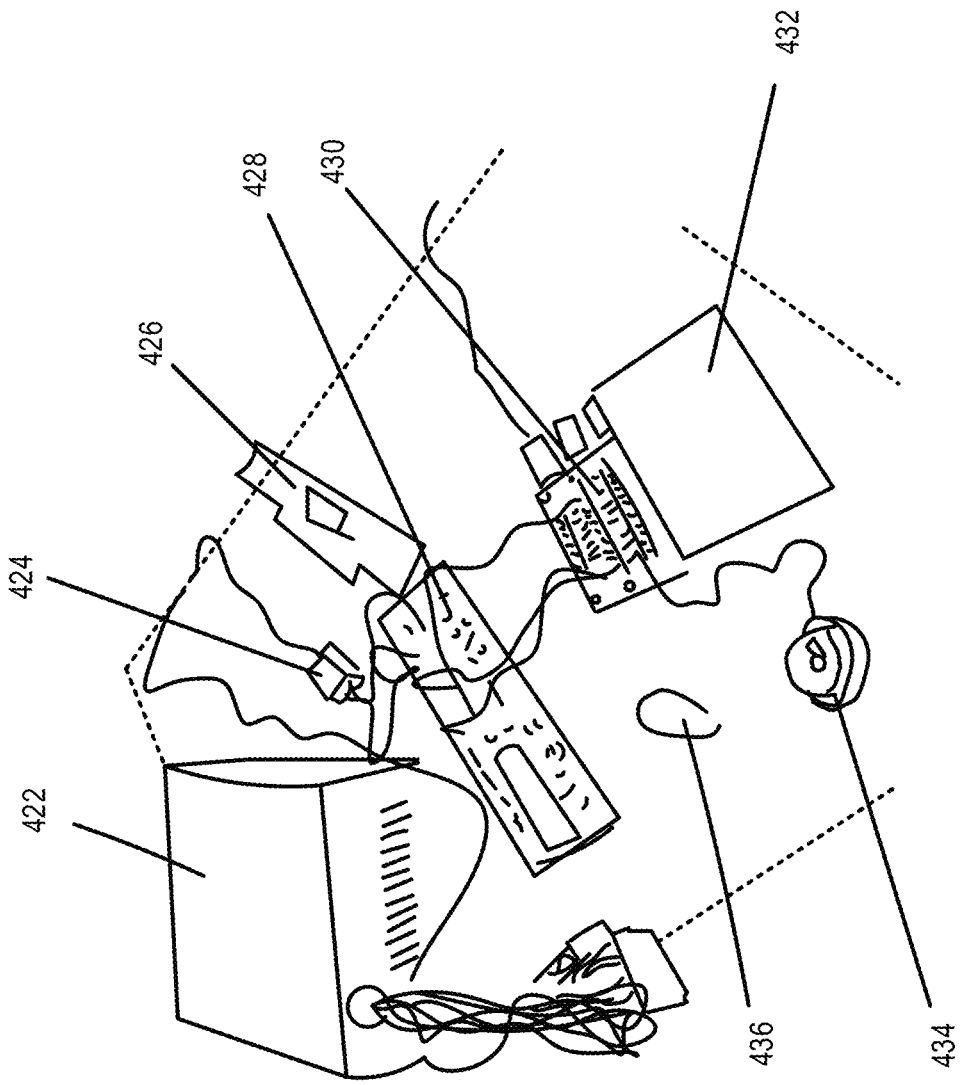
FIG. 4C depicts an exemplary computing system for implementing multi-factor badging, according to one embodiment.

In some embodiments, as discussed with respect to FIG. 4C, the computing environment 100 may include one or more embedded computing devices (e.g., one or more Raspberry Pi single-board computers). For example, an embedded computing device may be installed in a security system, such as a three-factor authentication system. The environment 100 may include more or fewer components. For example, in some embodiments, the environment 100 may include one or more smart light bulbs, one or more switches, one or more power supplies, one or more LED screens, one or more cameras, one or more EV charging stations, etc.

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device 102 and the server 104, and/or between multiple client computing devices 102, for example.

The client computing device 102 includes a processor 110 and a network interface controller (NIC) 112. The processor 110 may include any suitable number of processors and/or processor types, such as CPUs and one or more graphics processing units (GPUs). Generally, the processor 110 is configured to execute software instructions stored in a memory 114. The memory 114 may include one or more persistent memories (e.g., a hard drive/solid state memory) and stores one or more set of computer executable instructions/modules 120, including a graphical user interface (GUI) module 122, and a bot client module 124.

The client computing device 102 further includes an input device 140 and an output device 142. The input device 140 may include any suitable device or devices for receiving input, such as one or more microphone, one or more camera, a hardware keyboard, a hardware mouse, a capacitive touch screen, etc. The output device 142 may include any suitable device for conveying output, such as a hardware speaker, a computer monitor, a touch screen, etc. In some cases, the input device 140 and the output device 142 may be integrated into a single device, such as a touch screen device that accepts user input and displays output. The client computing device 102 may be associated with (e.g., owned/operated by) a company that services enterprise customers. In some embodiments, one or more client computing devices 102 may be implemented as a computing kiosk. For example, a building lobby may include one or more kiosk computing devices including touch screens for use by visitors during an e-reception process.

The NIC 112 may include any suitable network interface controller(s), such as wired/wireless controllers (e.g., Ethernet controllers), and facilitate bidirectional/multiplexed networking over the network 106 between the client computing device 102 and other components of the environment 100 (e.g., another client computing device 102, the server 104, an electronic database, etc.).

The one or more modules 120 implement specific functionality. For example, in an embodiment, the GUI module 122 includes computer-executable instructions that, when executed, cause a computer to display information (e.g., a web page, a computing application, data, etc) on a computing screen (e.g., via the output device 142). In an embodiment, the GUI module 122 receives input from the input device 140. For example, the GUI module 122 may receive an image via a camera input device 140. The GUI module 122 may receive typed information via a touch screen or keyboard input device 140. The GUI module 122 may include instructions for storing input (e.g., in the memory 120). The GUI module 122 may include instructions for transmitting the input via the network 106.

The bot client module 124 may store instructions for accessing a remote bot. The remote bot may accept commands and perform other functions, as discussed below. The bot client module 124 may convert user input into bot commands that the remote bot is programmed to execute.

The server 104 includes a processor 150 and a network interface controller (NIC) 152. The server 104 may further include a database 190. The database 190 may be a structured query language (SQL) database (e.g., a MySQL database, an Oracle database, etc.) or another type of database (e.g., a not only SQL (NoSQL) database). The server 104 may include a library of client bindings for accessing the database 190. In some embodiments, the database 190 is located remote from the server 104. For example, the database 190 may be implemented using a RESTdb.IO database, in some embodiments.

The processor 110 may include any suitable number of processors and/or processor types, such as CPUs and one or more graphics processing units (GPUs). Generally, the processor 150 is configured to execute software instructions stored in a memory 154. The memory 154 may include one or more persistent memories (e.g., a hard drive/solid state memory) and stores one or more set of computer executable instructions/modules 160, including a bot module 162, an e-reception module 164, a badging module 166, a parking module 168, a room module 170, a lighting module 172, an admin module 174, a reporting module 176, a machine learning module 178, a queueing module 180 and a scheduling module 182. Each of the modules 160 implements specific functionality related to the present techniques.

In some embodiments, a plurality of the modules 160 may implement a particular technique. For example, the e-reception module 164 and the badging module 166 may, together, authenticate a visiting user and a visited user. The modules 160 may exchange data via inter-process communication (IPC) within a single computing device, such as the server 104. In some embodiments a plurality of the modules 160 may be implemented in a plurality of computing devices (e.g., a plurality of servers 104). The modules 160 may exchange data among the plurality of computing devices via a network such as the network 106. The one or more modules 160 FIG. 1 will now be described with respect to a plurality of GUI applications and exemplary embodiments.

Exemplary Building Management Suite Web Application

Figure 2A:
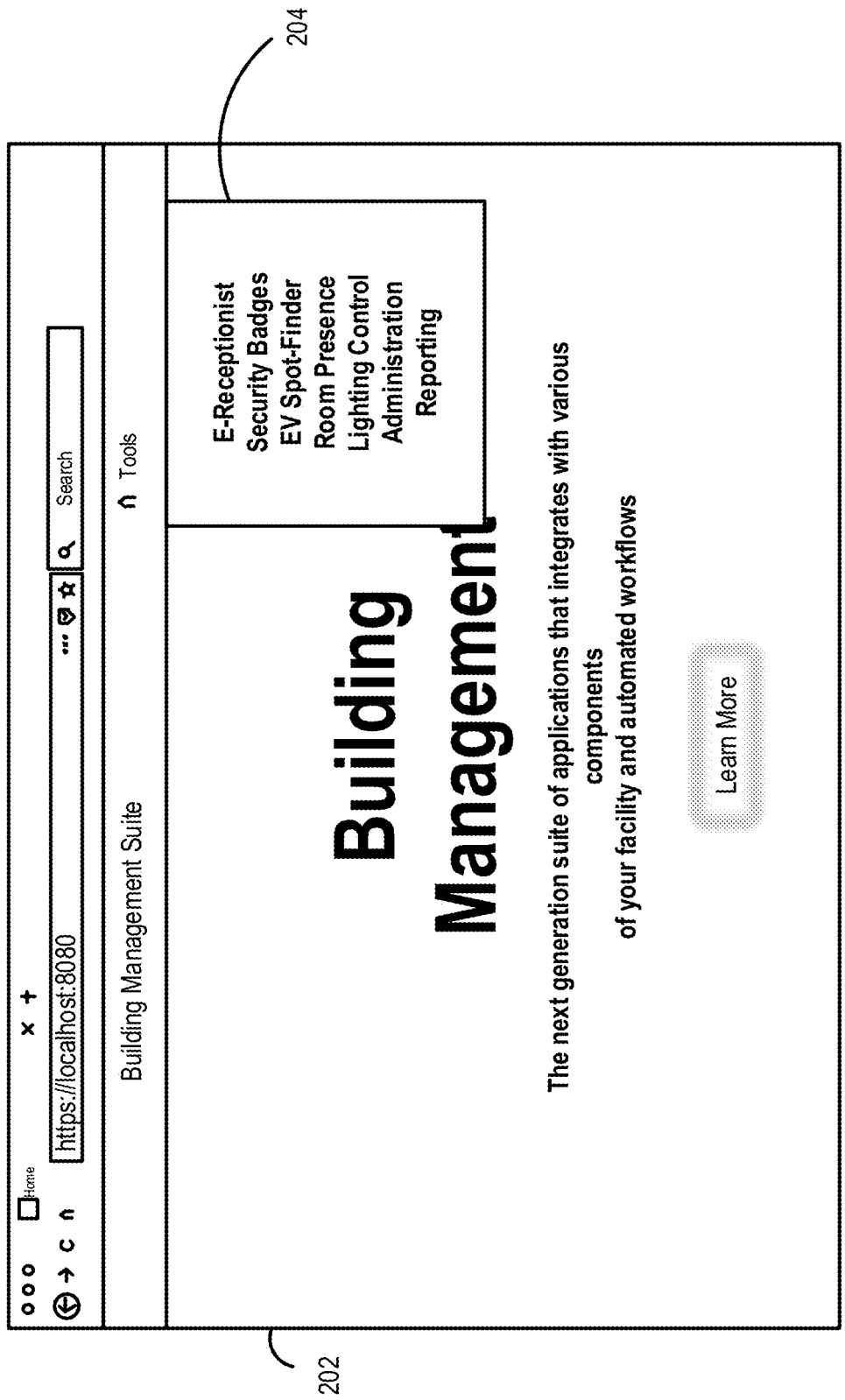
FIG. 2A depicts an exemplary building automation graphical user interface web application, according to one embodiment.

The functionality facilitated by the one or more modules 160 may be accessible via a networked application, in some embodiments. For example, FIG. 2A depicts an exemplary building automation GUI 200 including an application 202. The application 202 may be a web browser. The browser may correspond to a set of computer-executable instructions stored in the memory of a client application, such as the client computing device 102 of FIG. 1. The user may access a menu of available functions 204 that include multiple administrative links. In general, the application 202 is accessed by an administrative user of the company. The user may be required to authenticate before the application 202 allows the user to access the links within the menu 204. The application 202 may a web application served to the user by, for example, the admin module 174 of FIG. 1, via the network 106. The present techniques may provide charts and graphs depicting building activity.

Figure 2B:
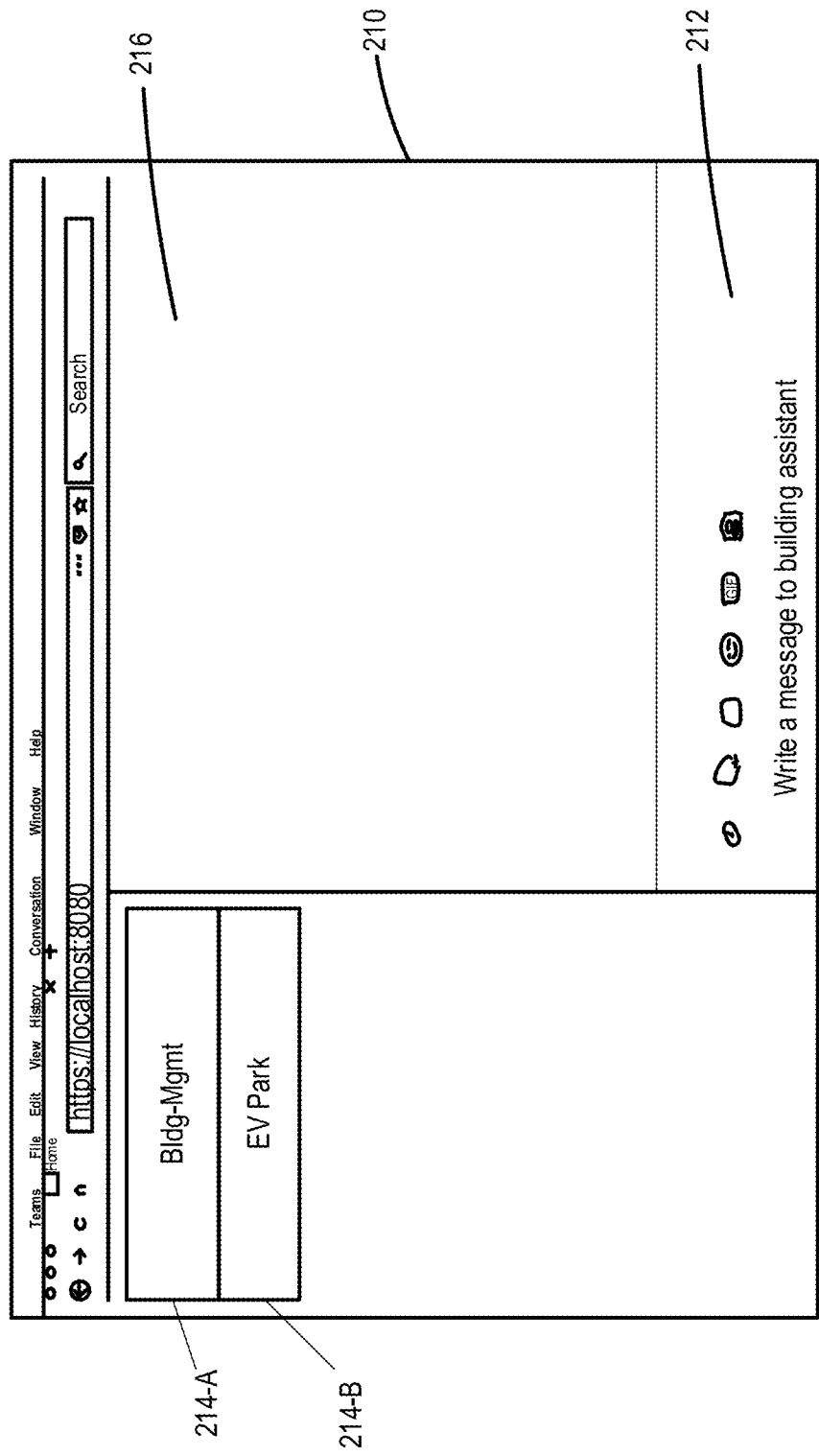
FIG. 2B depicts an exemplary building automation graphical user interface bot viewer, according to one embodiment.

FIG. 2B depicts a graphical user interface 200 including an exemplary building automation bot client application 210, according to one embodiment. The bot client application 210 may include computer-executable instructions for receiving a user input via an input field 212, transmitting the user input to a remote bot via a computer network (e.g., via the network 106 of FIG. 1) and/or for receiving and displaying output from the remote bot. In some embodiments, the bot client application 210 includes a plurality of channels 214. For example, the depicted embodiment includes a channel 214-A and a channel 214-B. In the depicted embodiment, the channel 214-A receives messages from the bot that are of a general building management nature, and the channel 214-B receives messages related to electronic vehicle parking. Commands typed by the user into the input field 212 may be automatically processed and analyzed by the remote bot. The input field 212 may accept commands that are formatted in a particular grammar, or syntax. For example, a command may be provided that includes one or more command arguments, as discussed below. Output received from the remote bot may be displayed in an output area 216.

Exemplary Automated Check-In (e-Receptionist) Embodiment

Figure 3A:
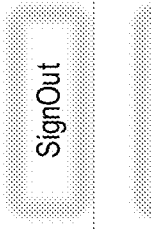
FIG. 3A depicts exemplary building automation e-receptionist data, according to one embodiment.
Figure 3A:
Figure 3A:
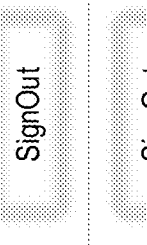
Figure 3A:
Figure 3A:
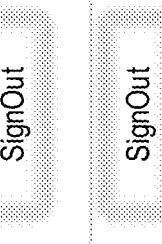

In addition to administrative features, such as the application 202, and bot features, as depicted in the application 210, the present techniques may include logging features. For example, FIG. 3A depicts a GUI 300 including a table 302 of logging information corresponding to building visitors. Each row of the table 302 includes a visitor full name, a corresponding visited full name, a visitor status, a visitor check in time, and a visitor image. The cells of the table 300 may be links, such that a user may access a link within a column (e.g., the status column) to receive/retrieve information or cause an action to occur. For example, the user may click a user image to view a larger image. The e-reception module 162 may generate the table 302 by receiving/retrieving information from a database (e.g., the database 190).

Figure 3B:
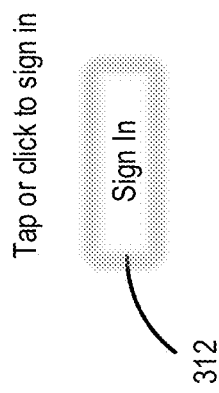
FIG. 3B depicts an exemplary building automation e-receptionist login graphical user interface, according to one embodiment.
Figure 3C:
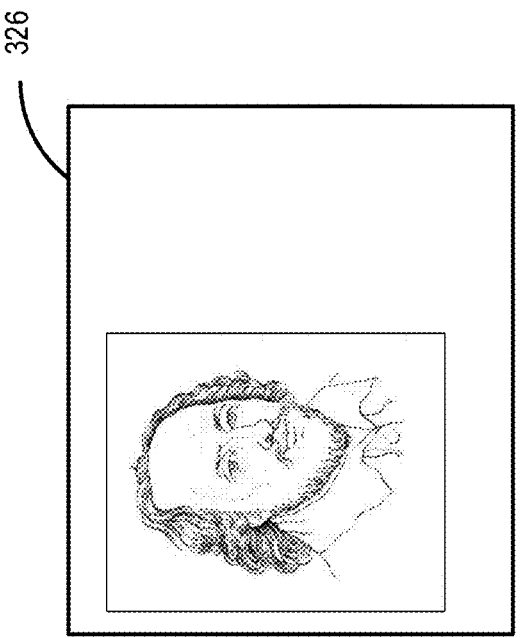
FIG. 3C depicts an exemplary building automation e-receptionist registration graphical user interface, according to one embodiment.
Figure 3C:
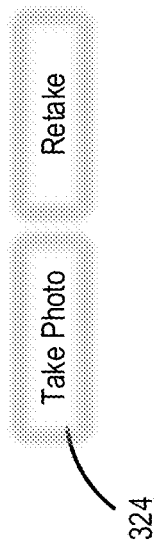
Figure 3D:
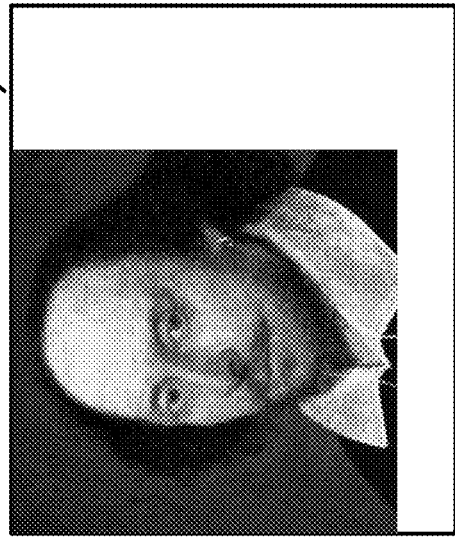
FIG. 3D depicts an exemplary building automation e-receptionist photo registration graphical user interface, according to one embodiment.

FIG. 3B depicts an exemplary GUI 310 including a login prompt 312. The e-reception module 162 may display the GUI 310 and the login prompt 312 in a kiosk computer of a building lobby, for example. In response to a user accessing the login prompt 312, the e-reception module 162 may display a visitor registration GUI 320, as shown in FIG. 3C. The visitor registration GUI 320 includes user registration information 322, action buttons 324, and a photo 326. The user may enter registration information 322 via an input device (e.g., the input device 140 of FIG. 1). The user may access the action buttons 324 to cause a camera to capture and/or recapture the image 326 of the user. For example, FIG. 3D depicts an exemplary visitor registration GUI 330, that may correspond to the visitor registration GUI 320.

Figure 3E:
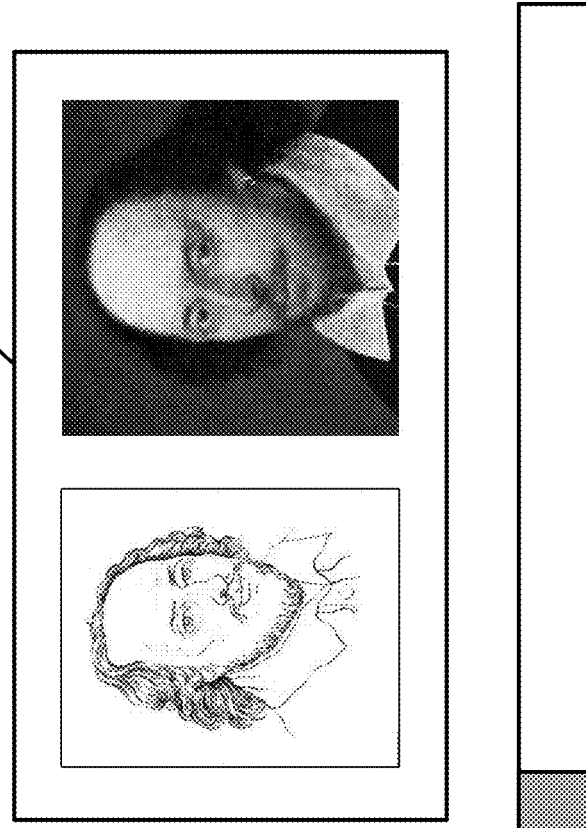
FIG. 3E depicts an exemplary building automation e-receptionist registration submission graphical user interface, according to one embodiment.

In the visitor registration GUI 330, the user has entered information and retaken the photo 326. In particular, the user has entered the name of a visited person. In FIG. 3E, a visitor registration GUI 340 displays the visitor's entered information, along with two photos captured by the visitor. The visitor registration GUI 340 further includes a progress bar 328 that may be displayed while the visitor registration GUI 340 processes the input provided by the user.

Specifically, in some embodiments, the GUI 310, the GUI 320, the GUI 330 and/or the GUI 340 are generated by the GUI module 122 of FIG. 1. Further, each may include instructions for submitting information via the network 106 to the reception module 164 of FIG. 1. The reception module 164 may include instructions for processing the input. For example, the reception module 164 may store the input in the database 190, pass the data to another module (e.g., the bot module 162), or take another action (e.g., transmit a notification to the visited person).

Figure 3F:
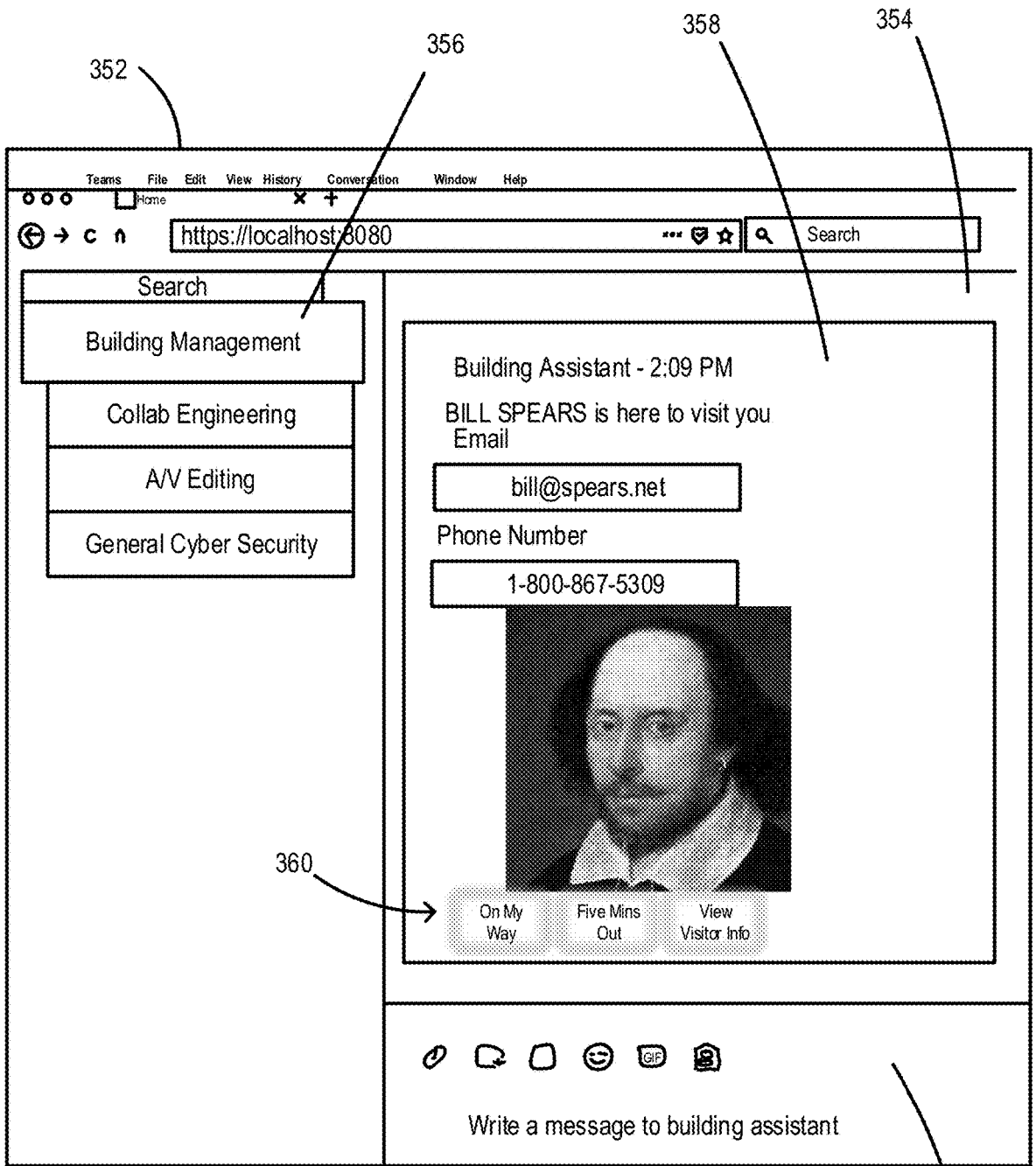
FIG. 3F depicts an exemplary building automation bot notification graphical user interface, according to one embodiment.

FIG. 3F depicts an exemplary GUI 350 for displaying notifications to a visited user. The GUI 350 includes an application 352 that may correspond to the bot client application 210 of FIG. 2B, in some embodiments. The application 352 includes an output area 354 and a channel list 356. The application 352 may receive one or more messages (e.g., a notification) in one or more channels concurrently. For example, the application 352 may include a plurality of concurrent HTTP connections to a remote server (e.g., the server 104). The application 352 may include instructions for displaying visual feedback (e.g., a text color, an animation, etc.) in association with display of the channels. The visual feedback may indicate when a message is received into one of the respective channels.

In some embodiments, the application 352 may display the one or messages in the output area 354. For example, as depicted in FIG. 3F, the application 352 may display a visitor arrival notification 358. The visitor arrival notification 358 may include information corresponding to that entered by the visitor (e.g., into the visitor registration GUI 320), wherein the information identifies the visitor to the user of the GUI 350 (i.e., the person visited). The visitor arrival notification 358 may further include one or more response inputs 360, wherein the user may access the response inputs 360 to transmit a predetermined message to the visitor and/or to view additional information about the visitor.

The GUI 350 may include instructions that are executed (e.g., by the GUI module 122 of FIG. 1) in response to the user accessing one or more of the response inputs 360. For example, the user may access a five minutes out button of the response inputs 360. In response to the user's access, the GUI module 122 may cause a message request to be transmitted to a notifications module in the server 104 (not depicted). The message request may include the information of the visitor, including the visitor email address, as well as a message corresponding to the accessed button or other GUI element. The notifications module may cause a notification to be transmitted to the visitor.

Figure 3G:
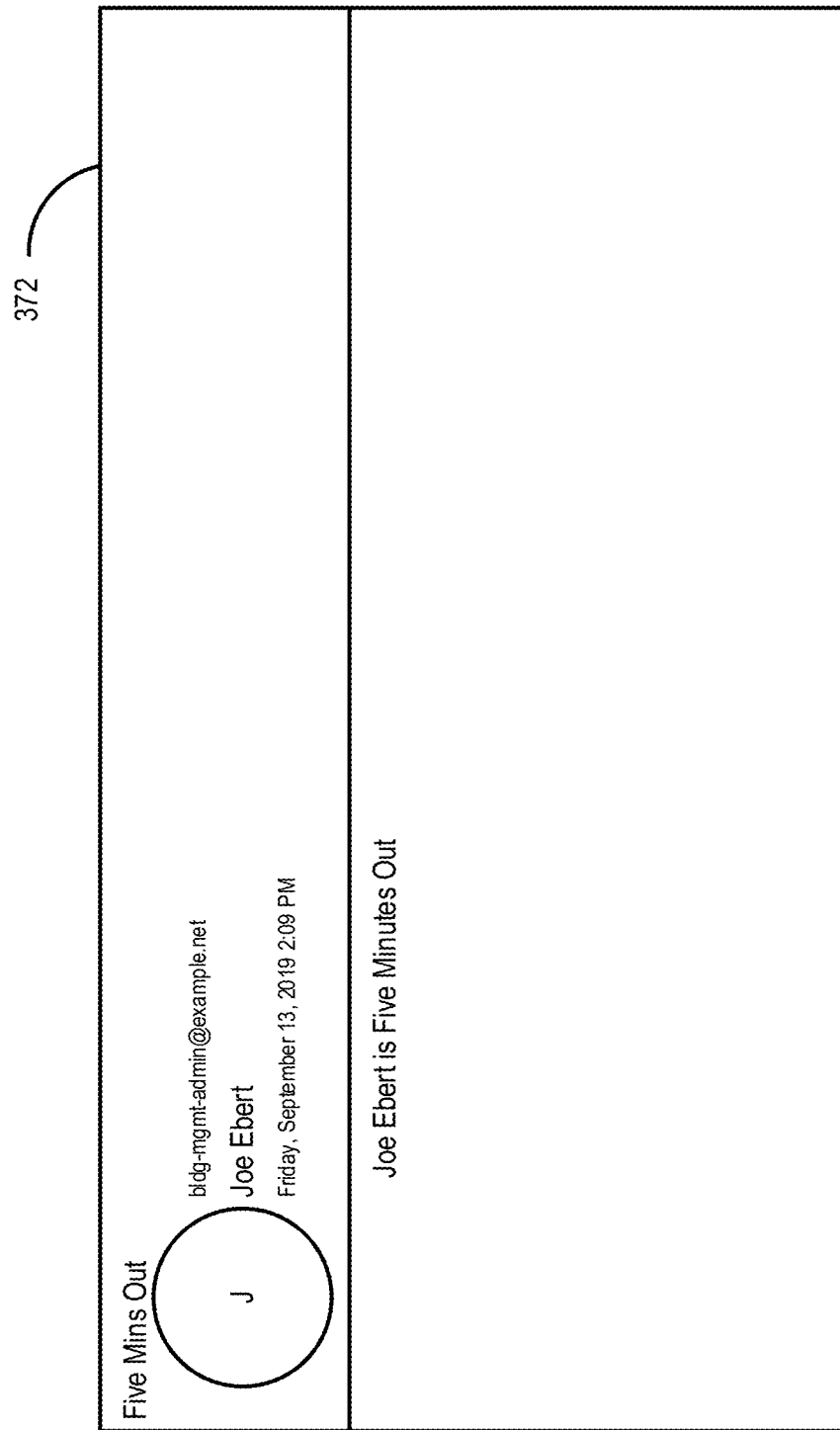
FIG. 3G depicts an exemplary building automation email notification graphical user interface, according to one embodiment.

FIG. 3G depicts an exemplary notification GUI 370 including an email message 372 corresponding to a notification. The email message 372 includes a message notifying the visitor corresponding to the response input 360 accessed by the visited user via the GUI 350. In some embodiments, other modes of communicating the notification may be used (e.g., a push message, a text message, an automated telephone call, etc.). It should also be appreciated that the response inputs 360 may include other predetermined notification messages and/or more complex functionality (e.g., the user may be prompted to enter a custom message to send to the visitor). In some embodiments, the user may reject the visitor. In still further embodiments, the user may enter bot commands into an input field 362. For example, the user may enter a command such as "notify visitor meet at the coffee shop." In that case, the GUI 370 may include instructions for analyzing the user's bot command (e.g., via the bot client module 124 of FIG. 1). The bot client module 124 may determine that "notify visitor" corresponds to a notification command, and that the remaining bot command (i.e., "meet at the coffee shop") is an argument for transmission as a message payload to the visiting user. The "notify" command may be sent by a preconfigured default notification route. In some embodiments, the user may specify a notification route (e.g., "email visitor," "text visitor," etc.).

FIG. 3H depicts a GUI 380 including a table 382 of logging information corresponding to signed in building visitors. Continuing the previous example, the visited user may greet the visitor (e.g., at a building lobby). The visited user may use one or more credentials (e.g., a personal identification number (PIN), a biometric credential, a radio frequency identification (RFID) tag, etc.) to identify the visited user. The visited user may self-identify by entering the one or more credentials, for example, into a client computing device (e.g., a computing kiosk) and authorizing the visitor based on the personal recognizance of the visited user. In some embodiments, the visited user may enter personally-identifiable information corresponding to the visitor into the client computing device (e.g., a scan of the visitor's state-issued identification card).

Once the visited user has authorized the visiting user, the client computing device (e.g., the client computing device 104) may transmit a request including the identification of the visitor and the identity of the authorizing visited user to a remote computing device (e.g., the server 104). The server 104 may generate a timestamp and insert a sign in record into the table 382. The sign in records provide administrators with an audit trail that advantageously allows the present techniques to automatically track the entry of visitors. The table may be, for example, a table stored in the database 190 of FIG. 1. In some embodiments, the reception module 164 of the server 104 may receive the request transmitted by the client computing device 102. The reception module 164 may cause another module (e.g., the badging module 166) to transmit a response to the client computing device 102. The response may include an authorization token and/or message notifying the visited user that the visitor may enter the premises of the building. The response may cause a turnstile or other physical barrier to open, allowing the visitor and/or visited user to physically access the premises of the building.

In still further embodiments, the response may cause a device (e.g., a 3D printer, an RFID card generator, etc.) to print and dispense a physical token for the visitor. The token may allow building occupants (e.g., an employee, a security officer, etc.) to visually identify the visitor as an authorized guest. The token may be automatically analyzed (e.g., by an RFID reader) to determine the location of the visitor within the building, and to determine when the visitor exits the building. Such RFID readers may cause the information in the table 382 to be updated (e.g., by inserting a sign out time). RFID tags and other forms of authentication data may be used in some embodiments to secure the premises of the building.

Exemplary Security Badging Embodiment

Security badging may be used to track the movements of visitors and building occupants within the building. For example, FIG. 4A depicts a GUI 400 including a monitoring application 402. The monitoring application 402 includes an output area 404 and an input field 406. The badging module 166 may monitor one or more aspects of the building via one or more sensors (e.g., via an RFID sensor as discussed above, via a camera, etc.). The badging module 166 may include a machine learning model trained to detect one or both of (i) motion, and (ii) objects (e.g., a human). When the badging module 166 detects motion, the badging module 166 may generate a notification and transmit the notification for display in the output area 404. As depicted, the notification may include a message including the category of detected object (e.g., Person), the location of the object (e.g., Zone 1 Door) and/or a live photograph or a file photograph. The badging module 166 may identify a file photograph by comparing a live photograph (i.e., a photograph captured in response to motion detection) to one or more lists of photographs. The lists of photographs may be searched in a priority order. For example, the badging module 166 may search current visitor photographs, followed by current employee photographs. In some embodiments, the badging module 166 may be configured to search for employees followed by consultants/contractors, as denoted by personnel records in the database 190.

In some embodiments, the present techniques may implement multi-factor badging authentication. Specifically, a badging client device may be configured to display a user registration GUI, such as the GUI 410 of FIG. 4B. Such a badging client device may be an instance of the client device 102, for example, and may be located in a secured location to prevent unauthorized access (e.g., in a building security office). When a new person (e.g., a building occupant/employee) needs access to the building, either temporarily or more permanently, the new person may enter information into an application 412 of the GUI 410. The application 412 may include instructions for displaying a form to collect user information, such as the full name of the user. The user may provide a PIN and may be assigned a physical RFID tag having an RFID number. The application 412 may include further instructions for collecting a profile photograph (e.g., a photograph of the user's face). Each of the pieces of information collected by the application 412 may be a respective factor used to identify the user. Some or all of the factors may be required to successfully identify the user, depending on the embodiment.

FIG. 4C depicts an exemplary computing environment 420 for implementing multi-factor authentication. The environment 420 includes a power supply 422, a lock relay 424, a door lock 426, a breadboard 428, a single-board computer 430, an LCD display 432, a camera 434, and an RFID tag 436. The power supply 422 may be a 12-volt power supply that operates in AC/DC mode, and supplies electric power to the other components of the computing environment 420. The lock relay may respond to electrical signals from the breadboard 428 and lock or unlock a locking rod or latch within the door lock 426 to an open or closed position. The breadboard 428 may be a general purpose input/output (GPIO) board, in some embodiments. The RFID tag 436 may be accessible via USB in some embodiments. The door lock 426 may include an electric door strike, in some embodiments.

The single-board computer 430 may be, for example, a Raspberry Pi computer. The single-board computer 430 may correspond to the client computing device 102, in some embodiments, and may include instructions for reading a PIN of a user and/or for reading information from the RFID tag 436. The single-board computer 430 may include instructions for capturing one or more images via the camera 434. The camera 434 may be any suitable wired and/or wireless (e.g., networked) camera, and may capture images in the visible spectrum and/or infrared images.

Figure 4D:
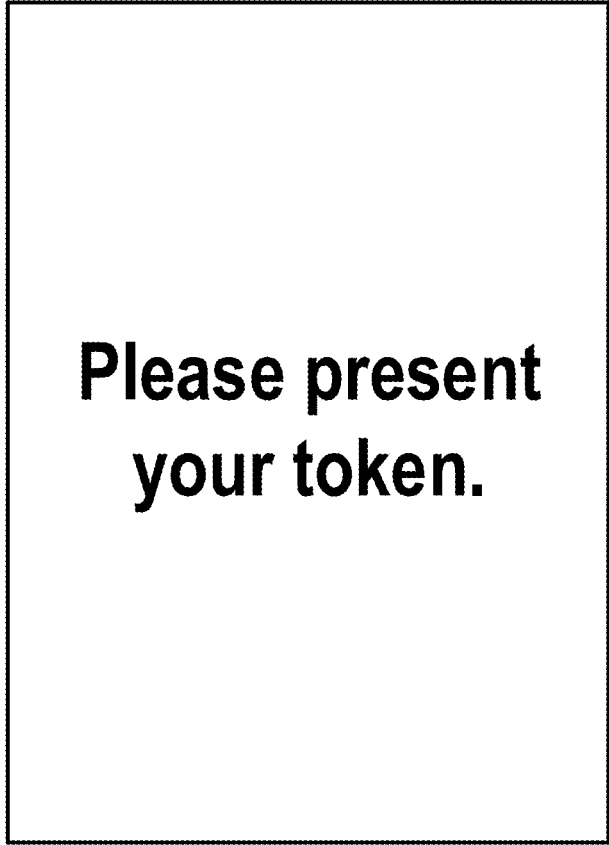
FIG. 4D depicts an exemplary multi-factor prompt graphical user interface, according to one embodiment.

In an embodiment, the server 104 may implement the single-board computer 430. In the case, the badging module 166 may include instructions for capturing a PIN, a photograph of a person, and/or an RFID tag/token (e.g., and RFID tag corresponding to the RFID tag 436). As depicted in FIG. 4D, to authenticate a user, the badging module 166 may request (e.g., via a GUI 440) that the user present the RFID tag. The badging module 166 may read a unique identifier (UID) from the RFID tag, which may act in a passive or active mode. The badging module 166 may compare the UID to a list of stored UIDs (e.g., by querying the database 190). When the UID matches one or more of the stored UIDs, the badging module 166 may return a Boolean value corresponding to a match or no match. The UID search may be a binary search, in some embodiments.

Figure 4E:
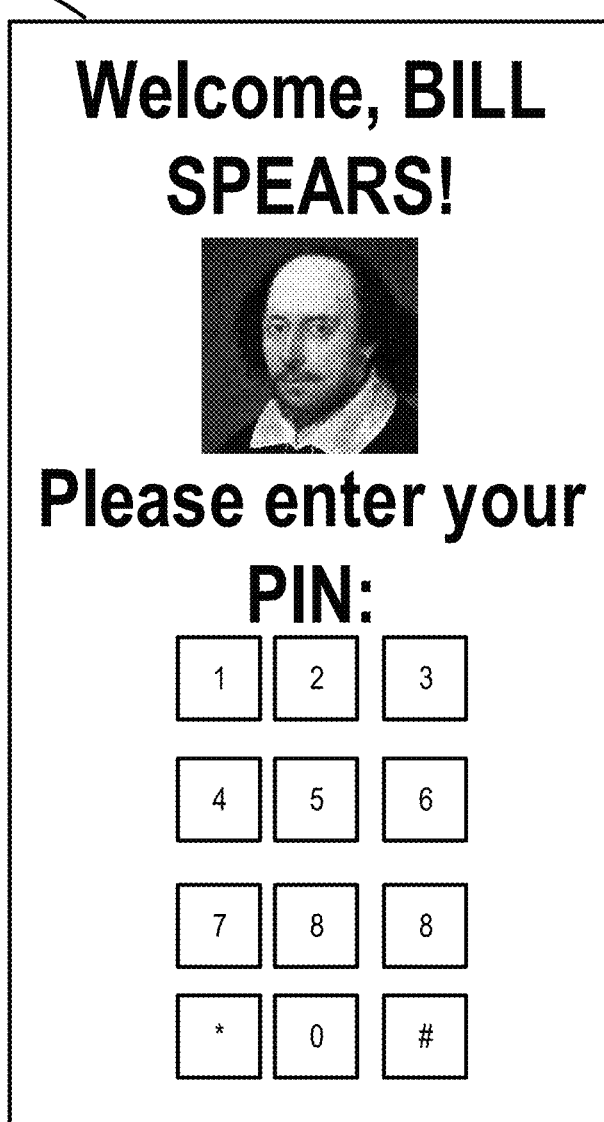
FIG. 4E depicts an exemplary multi-factor prompt graphical user interface, according to one embodiment.
Figure 4F:
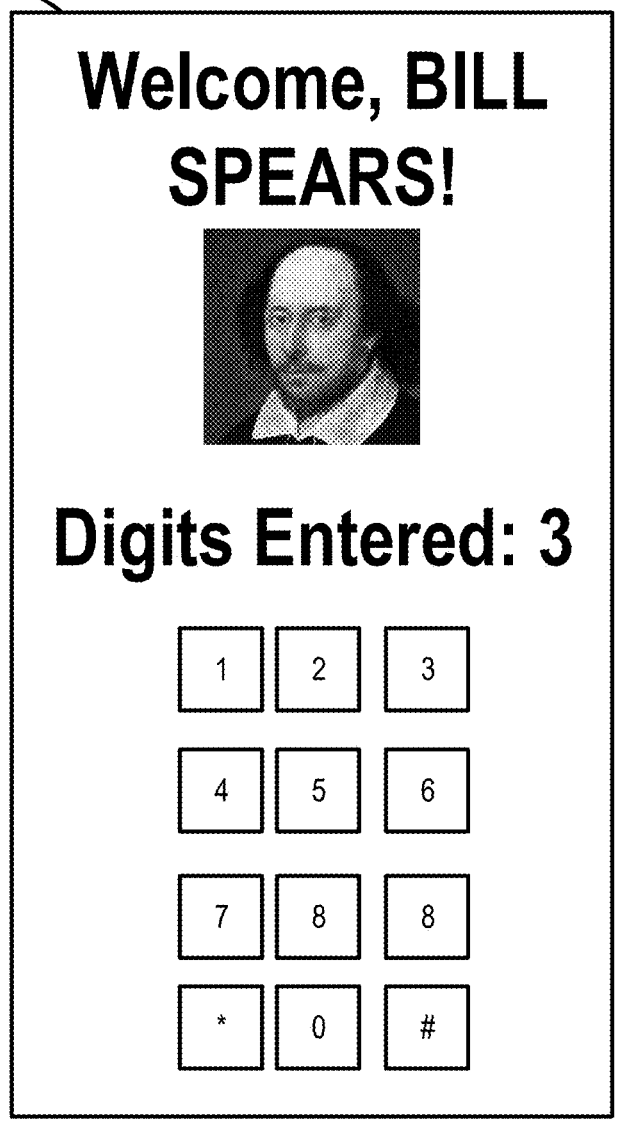
FIG. 4F depicts an exemplary multi-factor prompt graphical user interface, according to one embodiment.

In some embodiments, once the badging module 166 determines whether the UID matches a stored UID, the badging module 166 may proceed to analyze a second factor. For example, in some embodiments, the badging module 166 receives/retrieves an identifying factor from the user (e.g., a PIN). For example FIG. 4E depicts an exemplary GUI 450 including a PIN application 452 for receiving/retrieving a PIN from the user. In some embodiments, the application 452 corresponds to a set of computer-executable instructions stored in one of the modules 120, such as the GUI module 122. In some embodiments, the application 452 requests a PIN in response to the user's successful supply of a first factor (e.g., an RFID matching a stored RFID corresponding to the user). In some embodiments, the application 452 may display the number of digits entered by the user, as depicted in FIG. 4F.

Figure 4G:
FIG. 4G depicts an exemplary multi-factor prompt graphical user interface, according to one embodiment.

The badging module 166 may collect a third factor from the user in some embodiments. For example, once the user has supplied a known RFID tag and a PIN corresponding to the known RFID tag, the badging module 166 may request a photograph of the user, as depicted in GUI 460 of FIG. 4G.

The GUI 460 may include an application 462 that instructs the user to look at a camera. For example, the client 102 may display the application 462 in the output device 142 of the client 102. The application 462 may display an image capture countdown. A camera accessible to the client 102 (e.g., the input device 140) may capture a photograph of the user and display a message to that effect in the output device 142.

The client 102 may transmit the captured photograph of the user and an indication of the user's identity (e.g., a username, email address, or other unique identifier) to a remote computing device for analysis, such as the server 104. A module of the server 104 (e.g., the ML module 178) may retrieve a stored photo of the user using the unique identifier, and compare the captured photograph of the user to the stored photograph to predict a likelihood that the captured photograph and the stored photograph are of the same person. In some embodiments, the ML module 178 may analyze the photograph of the user using a trained facial recognition model. When the likelihood is above a predetermined threshold, the ML module 178 may indicate that the photos are a match.

The match of the two photos may be used as a third authenticating factor in some embodiments. In such embodiments, the successfully-authenticated user will have provided 1) physical access to a device provided by the building management (e.g., the RFID tag); 2) information known only to the user (e.g., the PIN); and 3) information indicating the physical identity of the user (e.g., the photograph). Thus, the present techniques provide a very strong authentication guarantee, in that the user has provided multiple factors. An attacker may be able to forge or steal one, or possibly two of the factors, but achieving simultaneous forgery/theft of all three factors may be much more difficult.

It should be appreciated that embodiments are envisioned wherein multiple instances of the computing environment 420 may be implemented in a building. For example, a first computing environment 420 may control a first door lock, while a second computing environment 420 controls a turnstile. The modules 120 and/or modules 160 may include instructions for managing the status of multiple independent instances of the computing environment 420.

Exemplary Electric Vehicle Spot Finder Embodiment

Figure 5A:
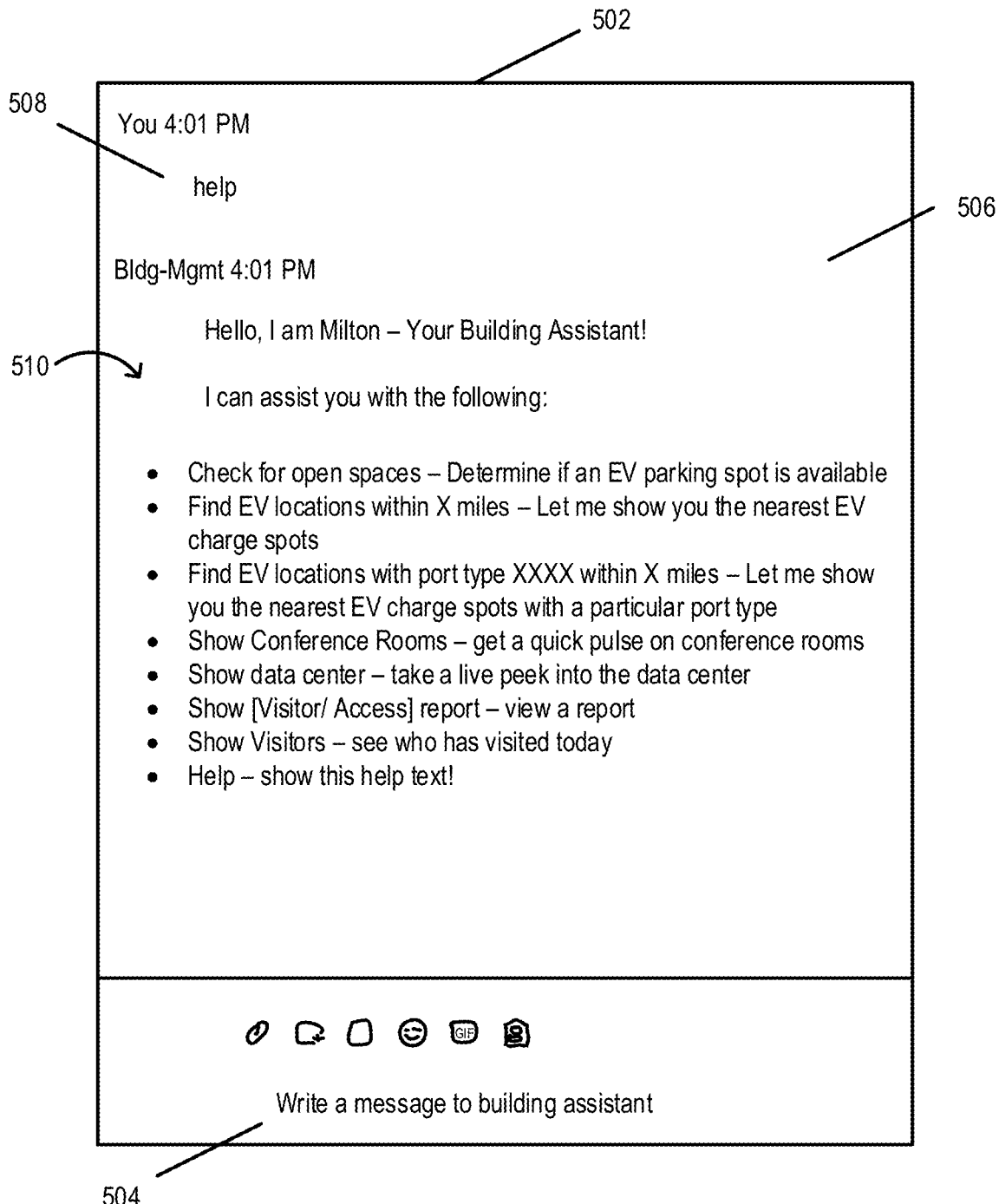
FIG. 5A depicts an exemplary bot command graphical user interface, according to one embodiment.

FIG. 5A depicts an exemplary help menu GUI 500 including a building management application 502. The application 502 includes an input field 504 and an output area 506 that may correspond, respectively, to the input field 406 and the output area 404 of FIG. 4A, for example. The input field 504 may accept one or more input commands and/or input parameters. The input commands and/or input parameters may be received by a set of computer-executable instructions executing in a memory, such as the GUI module 122 of FIG. 1. For example, in the depicted example of FIG. 5A, the user has typed the command 508. The command 508 is received by the GUI module 122, in an embodiment. The GUI module 122 may process the command, and output a message 510 into the output area 506. It should be appreciated that in the depicted example, the user is requesting help.

The help output may be stored as a static message, and therefore, the GUI module 122 may display the help output in the output area 506 by retrieving the static message from a memory (e.g., the memory 113, the database 190, etc.). However, for some commands that include dynamic output, and/or output that requires further analysis/computation, the GUI module 122 may cause one or more modules of a client computing device (e.g., the computing device 102) to process the user command to generate the output, and/or transmit one or more requests, and/or receive one or more responses to such transmitted requests via a network and/or a remote computing device (e.g., by accessing the server 104 over the network 106). For example, the bot client module 124 may process commands and/or parameters entered by the user.

The message 510 depicts exemplary commands available to the user (e.g., a building automation manager, an employee, etc.). In the depicted embodiment, the commands may be configured to manage aspects of electric vehicle parking, as shown in further detail in FIG. 5B.

Figure 5B:
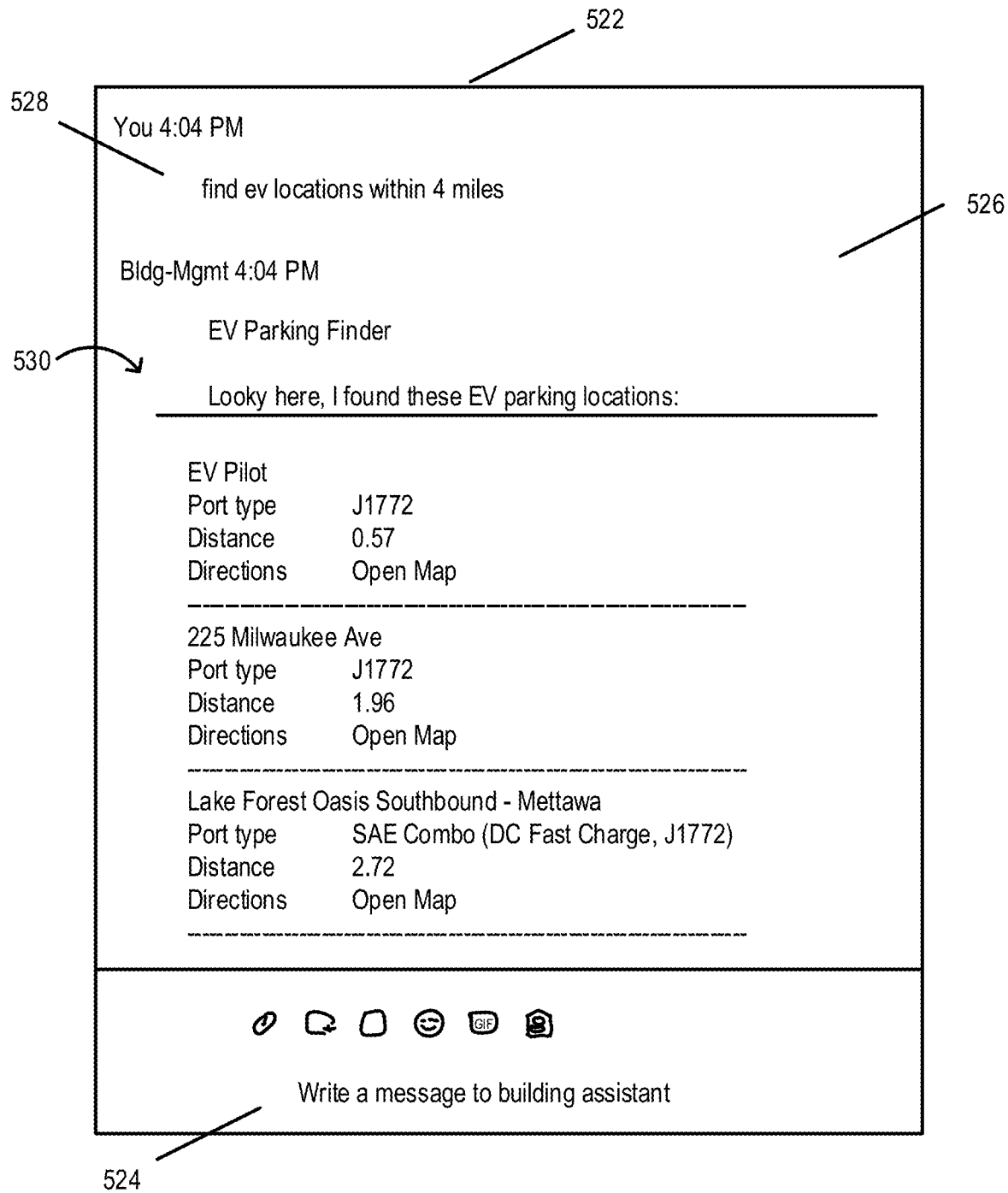
FIG. 5B depicts an exemplary bot command graphical user interface for map querying, according to one embodiment.

FIG. 5B depicts an exemplary GUI 520 that may correspond to the GUI 500. The GUI 520 may include an application 522 that has an input field 524 and an output area 526. The application 522 includes a user command (e.g., find EV locations) parameterized by a distance (e.g., 4 miles). The command output 530 includes a list of locations within a radius of the distance, including descriptive information about each of the locations. The descriptive information may include a name, an address, a respective list of port types, and a link allowing the user to access a map of the location. When the user accesses the link, the application 522 may be configured to display map, as depicted in FIG. 5C.

Figure 5C:
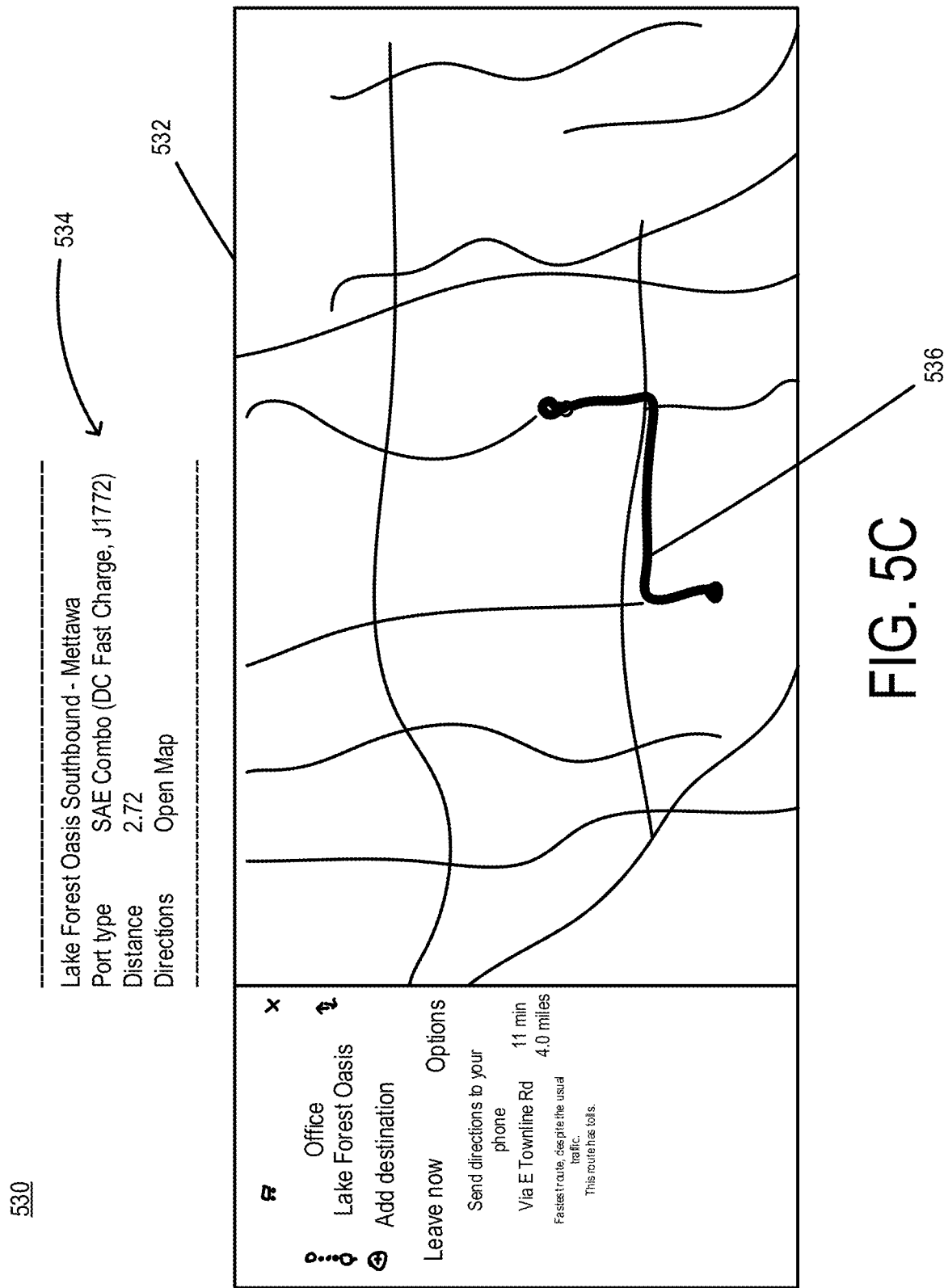
FIG. 5C depicts an exemplary map graphical user interface for displaying map query results, according to one embodiment.

FIG. 5C depicts a GUI 530 including a map 532. The map 532 includes a map description 534 corresponding to one of the list of locations depicted in FIG. 5B. The map includes a route 536 depicting a route from the user's current location to the one of the list of locations. Therefore, by using commands, the user may find suitable parking locations that are nearby the user's current location. In some embodiments, the user's current location is fixed, such as when the user is within a building. In some embodiments, the GUI module 122 may access a GPS module of the client 102 (not depicted) to determine the user's location. In still further embodiments, web-based technologies (e.g., Geolocation) may be used to determine the location of the user based on the location of the user's device.

Figure 5D:
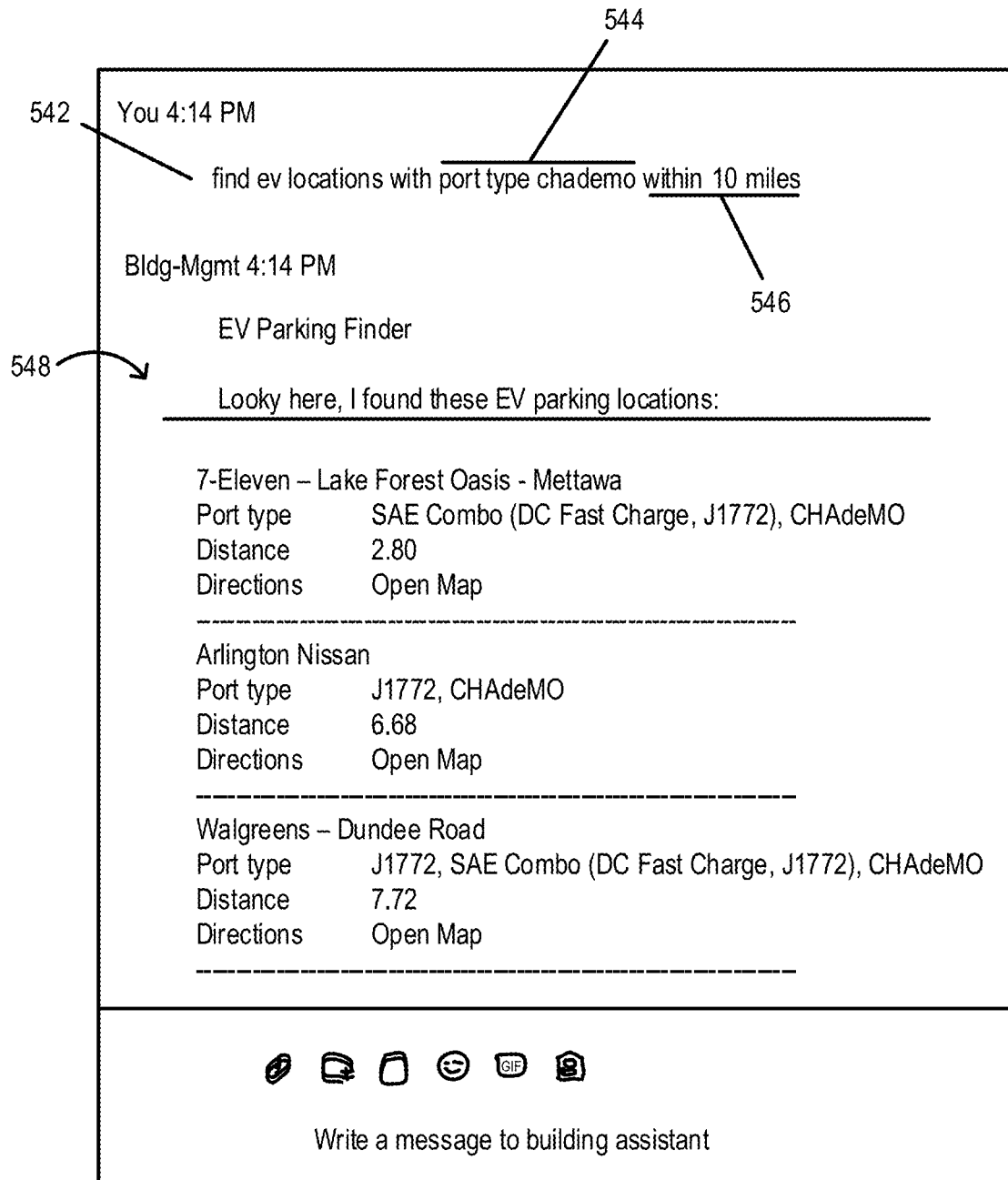
FIG. 5D depicts an exemplary bot command graphical user interface for map querying, according to one embodiment.
Figure 5E:
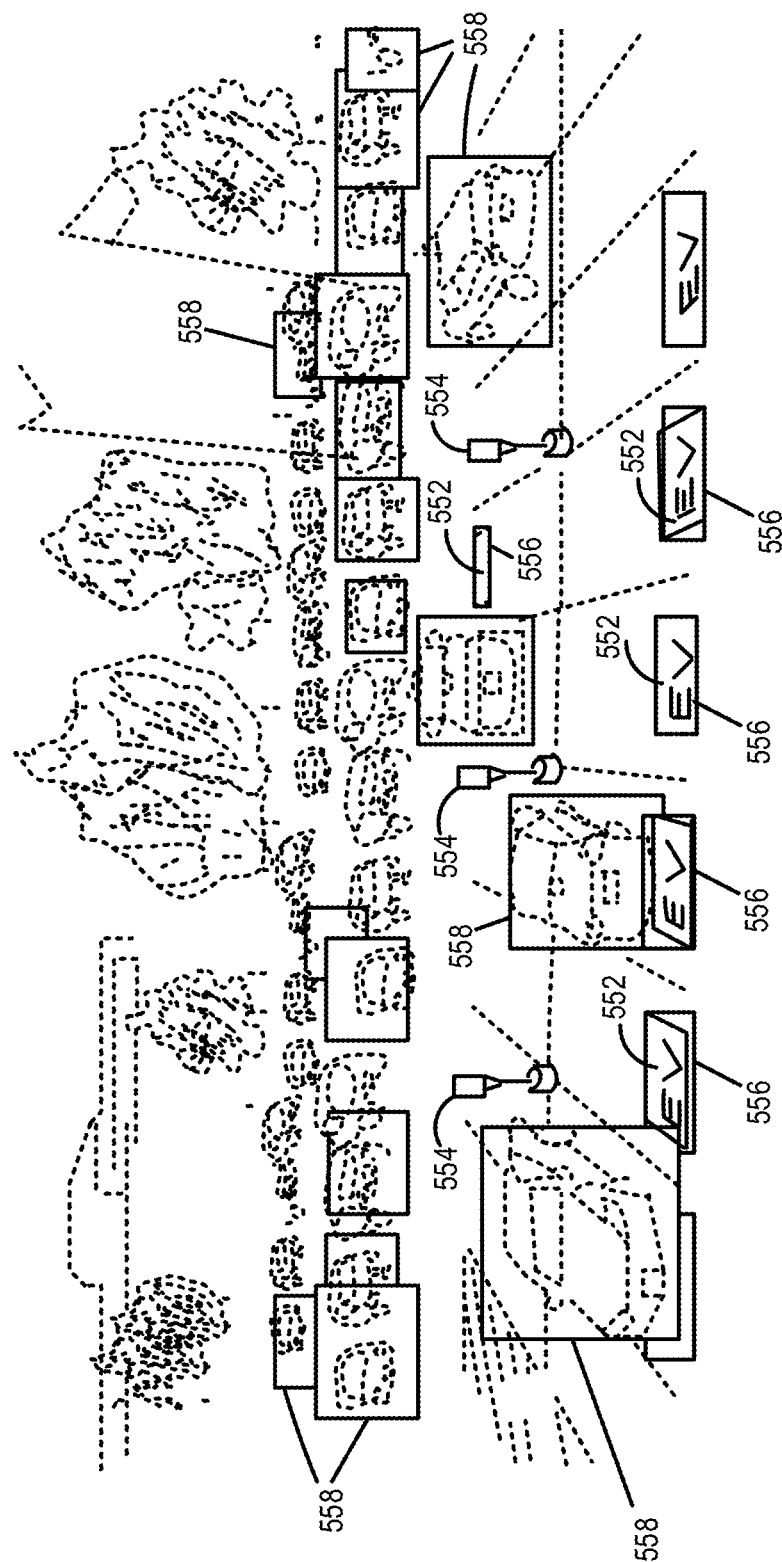
FIG. 5E depicts an exemplary mixed-use parking lot, according to one embodiment.

The present techniques may be used to identify an open/available EV parking spot/space. For example, the user may enter a command/instruction into the input field (e.g., "Check for open spaces") as shown in FIG. 5A. The GUI module 122 may be configured to analyze an image of a physical area to identify one or more open space. For example, FIG. 5E depicts a parking area 550 including one or more parking spaces each of which may contain a respective vehicle. The parking area 550 may correspond to a photograph of a parking lot, in some embodiments. In some embodiments, the GUI module 122 may transmit the user command to a module of a remote computing device, such as the parking module 168 of FIG. 1. The parking module 168 may further analyze the command, for example, via the ML module 178.

The parking spaces in the parking area 550 may be marked or unmarked, wherein the presence of a marking indicates a spot type. For example, the parking spaces may include one or more EV parking spaces 552, denoted by the presence of an EV marking. The marking may be applied to the parking space using paint, for example. An accessible, disabled or handicap parking space may include another marking type. The EV parking spaces may each include a charging port 554.

In some embodiments, the charging port 554 may be an instance of the client 104. For example, the charging port 554 may be communicatively coupled to the network 106. The charging port may include an input device 140 and an output device 142, for example. The charging port 554 may provide electric power to EVs for charging, and may include a data link communication to/from EVs.

As noted, the present techniques may assist a user by identifying an open/available EV parking space. Identifying the open/available EV parking spaces may include the application of computer vision techniques and/or machine learning. For example, the ML module 178 of FIG. 1 may be configured to analyze an image of a physical area (e.g., the parking area 550) using one or more trained ML model. The image of the physical area may be captured by a camera communicatively coupled to the client 102 or the server 104, for example. For example, in an embodiment, the client 104 may be a camera capture device stationed in a parking area (e.g., the parking area 550).

The camera may correspond to the camera 434, in some embodiments. The camera may be implemented as a using a Cisco Meraki Cloud Managed Security Cameras, in some embodiments. The camera may be communicatively coupled to the network 106, and thus, images captured by the camera may be analyzed by the one or more trained ML model of FIG. 1. The one or more ML model may be trained by the ML model 178 analyzing labeled images. The one or more ML model may be operated by the ML module 178 of Figure and/or by the parking module 168.

In some embodiments, an existing library/programming language may be used for implementation, such as Python/OpenCV. A pre-trained network such as the Resnet 50 neural network may be implemented. Google TensorFlow may be used to implement a particular ML technique. In some embodiments, a convolutional neural network (CNN) may be trained on many images to recognize/identify vehicles. For example, a pre-trained deep neural network may be used to identify only electric vehicles in the parking area 550. Other supporting technologies that may be used to implement aspects of the present techniques in some embodiments include xAPI Phillips-E, Amazon Alexa, AWS Rekognition, Dropbox file storage application programming interface (API), Google Dialogflow API, Meraki API, JavaScript Webcam API NodeMailer email API Open Charge Map API, Phillips HUE API and Cisco Webex Teams API. Further technologies that may be used to implement the present techniques include Python, JavaScript, Tkinter, jQuery and Node.js.

For example, in some embodiments, the modules 120 may include a voice recognition module (not depicted) that integrates with Amazon Alexa to accept voice commands from the user. The user may speak a command such as, "Alexa, tell the general room a message." The user may be prompted to speak a message. The user may respond, "Tell bot to show data center." In response to the user's command, the bot client 124 may be caused to display the requested message on the output device 142. Additional voice-enabled functionality may be implemented using an existing third-party API and/or using a voice recognition module in the modules 120 (not depicted). The user may query the number of conference rooms, for example, including the number of occupants. The user may control lighting using the voice-enabled functionality.

Figure 5F:
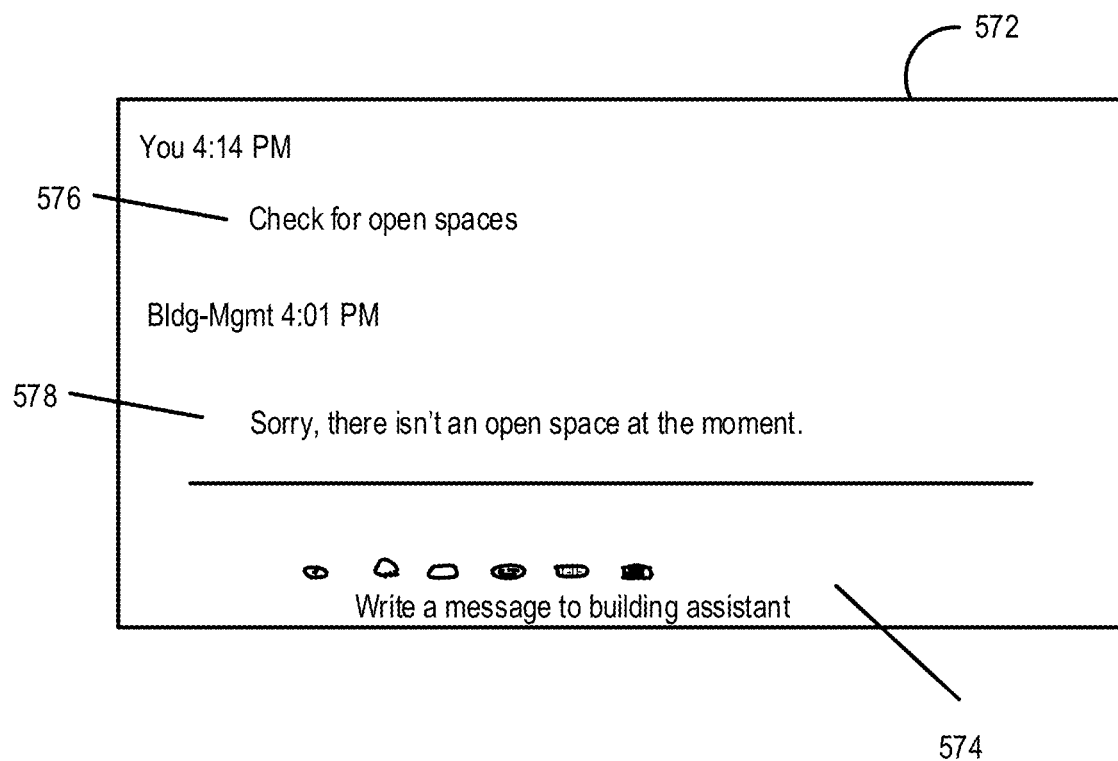
FIG. 5F depicts an exemplary bot command graphical user interface for parking querying, according to one embodiment.

The user may enter a command that accesses the EV parking space identifying capabilities of the present techniques. For example, FIG. 5F depicts a GUI 570 including an application 572. The application 572 includes an input field 574. The application 572 depicts an example input command 576. The input command 576 may be output, or echoed, to the application 572 via an output device, such as the output device 142. The input command 576 may be received via the GUI module 122 and additionally/alternatively transmitted to a command processing module, such as the bot client 124 and/or the parking module 168. The parking module 168 may receive/retrieve a real-time image of the parking spaces in the parking area 550. The parking module 168 may analyze the image of the physical area to identify one or more vehicles in the parking area 550. The parking module 168 may further identify one or more spaces. Identifying the vehicles and spaces may include analyzing the image using one or more respective trained ML models.

For example, the parking module 168 may analyze the image using one or more trained ML models. The ML models may analyze contours of the image. The parking module 168 identify one or more contours of the image and may iterate over the contours. The parking module 168 may use a Douglas-Peucker algorithm to generate an approximate contour for the image, wherein the approximation identifies one or more parking spots 556 by identifying bounding boxes corresponding to an object of interest (e.g., a parking space, a vehicle, etc.). The one or more ML models may store a set of pixel coordinates (e.g., x1, y1, x2, y2) defining each bounding box relative to the image.

In some embodiments, a vehicle detection ML model may identify a list of vehicles using a vehicle object detection machine learning model. The parking module 168 may receive a set of pixel coordinates for each identified vehicle from the ML model, and store the pixel coordinates (e.g., in the database 190). The vehicle object detection ML model may be a retina net and may identify vehicles such as passenger cars, motorcycles, and/or trucks, as depicted in FIG. 5E. The output of the vehicle object detection ML model may include a vehicle type flag denoting the vehicle type as a passenger vehicle, motorcycle, truck, etc. The vehicle object detection ML model may identify the one or more vehicles in the parking area 550 as discussed above by drawing one or more vehicle bounding box 558 around the identified vehicles in the image. A spot detection ML model may identify a list of EV spots. The spot detection ML model may store pixel coordinates for each of the identified EV spots.

The parking module 168 may compute the area of spot bounding boxes 556 and the area of vehicle bounding boxes 558, and compare the respective areas, to determine respective overlap. When there is a predetermined amount of overlap (e.g., less than 40%), the parking module 168 may determine that the spot is unavailable. Of course, the overlap threshold may be adjusted to increase the sensitivity of the modeling. When there is not overlap, the parking module 168 may determine that the spot is available. The status of the respective parking spots within the parking area 550 may be stored in the database 190, for example. The historical status of the parking spots may be stored and queried over time. The parking module 168 may compute the width and height of the overlap of each vehicle bounding box with each spot bounding box by computing the intersection of the boxes.

In some embodiments, as depicted in FIG. 5F, the bot may notify that user via the application 572 that no spots are available. In such cases, the user may be prompted to query nearby EV parking locations with particular port types as shown in FIG. 5D, sorted by least distance, and filtered by port type. Specifically, the user command 542 includes a user-specified port type 544 and a user-specified proximity 546. In this way, the present techniques advantageously improve the efficiency of locating geographically proximate charging stations 548 that are limited to an appropriate port type for the user's vehicle, and are within a specified distance. In some embodiments, the charging stations 548 may be automatically displayed to the user in response to detection by the present techniques of a full local parking lot.

Figure 5G:
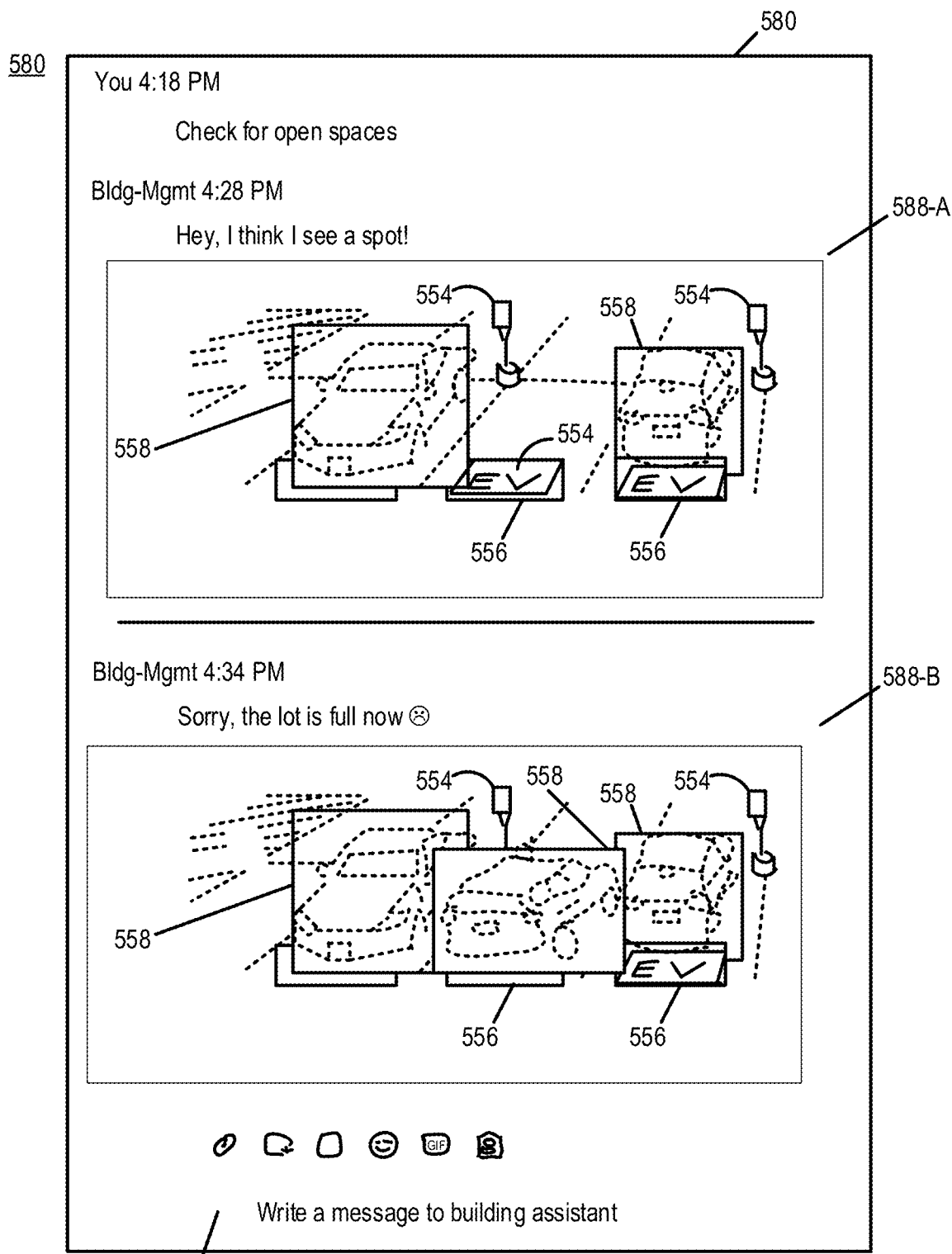
FIG. 5G depicts an exemplary bot command graphical user interface for parking querying, according to one embodiment.

The spot identification techniques discussed with respect to FIG. 5E may be used periodically and/or upon user demand. For example, FIG. 5G depicts an exemplary GUI 580. The GUI 580 includes an application 582 that may correspond to the building automation bot client application 210, in some embodiments. The application 582 may include an input area 584 for receiving user commands and an exemplary command 586. The application 582 may include a first exemplary output message 588-A notifying the user, in response to the input command 586, that a spot is available in the parking area 550. The spot identification may function as discussed with respect to FIG. 5F. In some embodiments, the open spot may be identified visually by way of color highlighting, font styling (e.g., bold/italicized text), animation or other suitable means.

The spot identification techniques discussed with respect to FIG. 5E may be periodically executed (e.g., once every five minutes) and when the status of the parking area 550 changes, the parking module 168 may generate an output and transmit the output to the user. For example, the parking module 168 may periodically call the trained spot identification model. The model may generate output indicating that a spot is available, and/or that an available spot is no longer available. As depicted in FIG. 5G, the model may generate a second exemplary output message 588-B notifying the user that the spot is no longer available in the parking area 550.

Figure 5H:
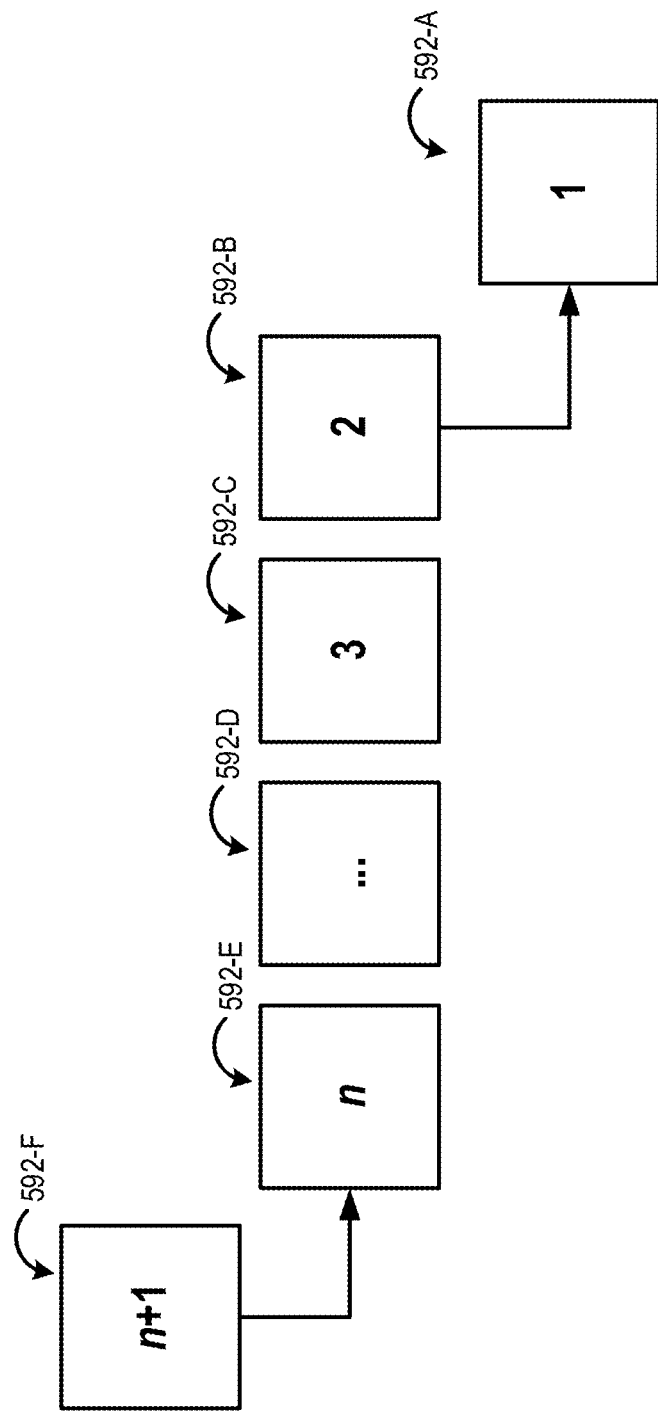
FIG. 5H depicts an exemplary parking space request queue, according to an embodiment.

FIG. 5H depicts a parking space request queue 590. In some embodiments, the parking space request queue 590 may be implemented as a first-in first-out (FIFO) queue. The parking space request queue 590 may include a number n of queue elements 592. The parking space request queue 590 may include a head element 592-B and a tail element 592-E. The parking space request queue 590 may support queue elements, such as removing the head element (dequeueing), as shown in FIG. 5H by the removal of an element 592-A. The parking space request queue 590 may support adding the tail element (enqueueing), as shown in FIG. 5H by the adding of a tail element 592-F.

The parking space request queue 590 may be ordered as depicted in FIG. 5H, such that the element 592-A is the first added and first removed, the element 592-B is the second added and second removed, an element 592-C is the third added and third removed, the element 592-E is the nth added and nth removed, and an element 592-F is the n+1th added and n+1th removed. In other words, in a FIFO queue embodiment, the elements 592 may be added and removed in the same order. Each of the parking space request queue 590 elements may correspond to an input command, such as the input command 576. For example, multiple users may request an open space by entering respective input commands 576 into multiple instances of the client computing device 102. The parking space request queue 590 may support instructions for counting the number of elements in the queue, and for searching the queue, for example to find the index value/position of an element (e.g., a user command) within the queue.

In some embodiments, the parking space request queue 590 may order available parking space requests from multiple users and avoid assigning a single open parking space to multiple requesting users. Specifically, in some embodiments, multiple users may request an available space. The GUI module 122 of each respective user device 102 may transmit each user space request to the queueing module 180. The queuing module 180 may insert each user space request into a parking space request queue 590. In such cases, the parking module 168 may include instructions for checking the size of the parking space request queue 590. When the parking space request queue 590 is non-empty, the parking space module 168 may analyze a parking area (e.g., the parking area of FIG. 5E) as discussed herein to identify one or more open spaces. For each identified open space returned by a trained ML model, the parking module 168 may dequeue one of the requests from the parking space request queue 590 and notify the user corresponding to the request (e.g., via the network 106) that the respective identified space is assigned to the user. The parking module 168 may include a parking space identifier. The space identifier may be included in each space (e.g., using a paint, a sign, a label, etc.), so that the user can identify the correct space for parking. The space identifier is noted in FIG. 10, below.

In some embodiments, the parking space module 168 may request open spaces from the trained ML module on demand in response to a user request. In other embodiments, the scheduling module 170 may periodically request open spaces from the ML module 178. For example, the scheduling module 170 may request open spaces at an interval (e.g., every 5 minutes) and assign the open spaces by dequeueing any requests from the parking space request queue 590. Users may access the parking space request queue 590 using a client computing device 102. Such users may be building administrators, building employees, employees of businesses located within the building, and/or building visitors.

In some embodiments, the parking module 168 may instantiate multiple parking space request queues 590. For example, the parking module 168 may instantiate a first parking space request queue 590 to handle general parking requests (e.g., for non-EV parking). The parking module 168 may instantiate a second parking space request queue 590 to handle all EV requests. The parking module 168 may instantiate a third parking space request queue 590 to identify spaces having a specific charging port type. Practically, any suitable number of individual parking space request queues 590 may be supported. For example, each tenant of a large building (e.g., a building housing tens of thousands of occupants or more) may be assigned one or more parking space request queue 590. Each parking space request queue 590 may be associated with particular parking spaces. Each parking space request queue 590 may be associated with an individual trained ML model that is trained, respectively, to identify spots having particular characteristics (e.g., owned by the tenant, supporting J1772 charging, non-EV parking space, etc.).

Exemplary Room Presence Embodiment

In an embodiment, the present techniques may be used to manage aspects of room presence. For example, FIG. 6A depicts a GUI 600 including a table 602 of room presence information. The table 602 may include one or more rows, each corresponding to a room within the building/buildings. Each row may include room information such as a name, a Boolean flag indicating the presence of people in the room, a count of people, a call status, a map link, etc. A user may access information corresponding to each room by accessing the map link. The GUI 600 may include instructions that cause the GUI 600 to display additional information in response to user input. For example, when the user accesses the map link within a row of the table 602, the GUI 600 may display a detailed map of the room corresponding to the accessed row.

Figure 6B:
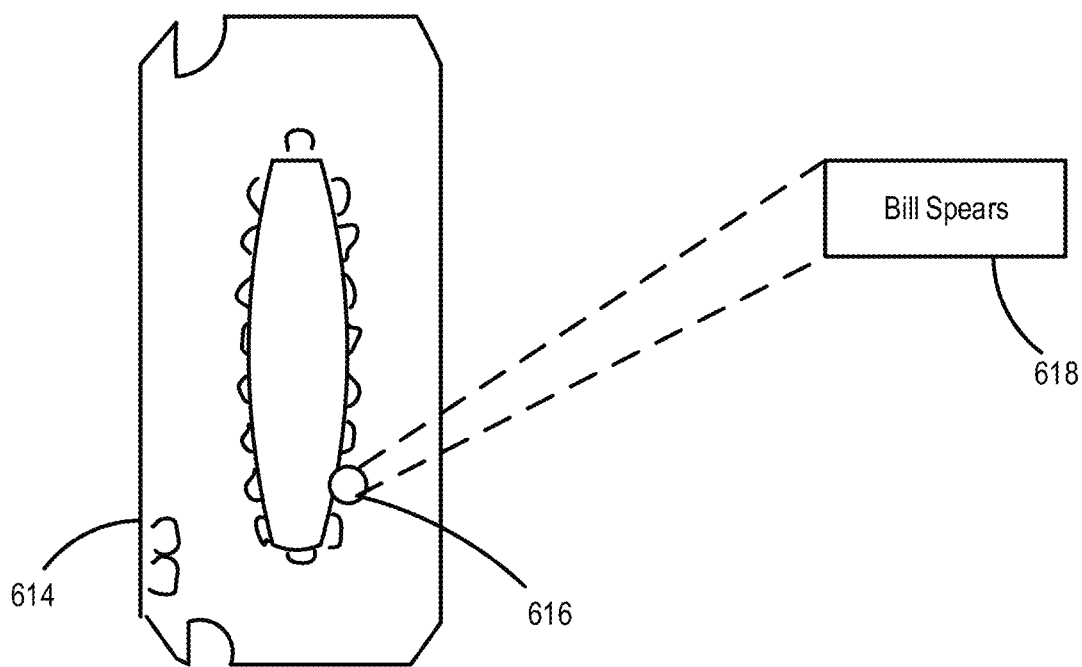
FIG. 6B depicts an exemplary room presence graphical user interface, according to an embodiment.

FIG. 6B depicts a room layout GUI 610 that includes a detailed real-time room view 612. The room view 612 includes a room diagram 614 including a person indicator 616. When the user accesses the person indicator 616, the GUI 610 may display a person identifier 618 that includes the identity of the corresponding person. The GUI 610 may receive the name of the room and/or a unique room identifier as a parameter when the user accesses the map link of the GUI 600. The GUI 610 may include instructions for querying the database 190, for example, to retrieve a list of names of people whose RFID tags are located within the room depicted in the room view 612. In some embodiments, the room module 170 may include computer-executable instructions that when executed, analyze the room presence information to find a next-available conference room.

In some embodiments, the presence of a person in a room may be detected by the room module 170, for example, detecting activity in the room. For example, the room module 170 may continuously monitor one or more video feeds each corresponding to a room. The room module 170 may include instructions for processing individual video frames to detect an object (e.g., a person).

Exemplary Lighting Control Embodiment

Figure 7A:
FIG. 7A depicts an exemplary lighting control graphical user interface, according to an embodiment.

The present techniques may be used to control aspects of room lighting. For example, FIG. 7A depicts an exemplary GUI 700 including lighting control access 700. The user may access the lighting control access 700, via a secured control panel that requires authentication. For example, the control panel may correspond to the input device 140, and the lighting control access may be provided in a stationary access panel implemented as an instance of the client 104 (e.g., a panel affixed to a wall within the building). In some embodiments, the lighting control may be implemented as an application installed in a smart phone of a user. The rooms may include one or more occupancy sensors that allow the lighting control module 172 to determine and/or count the presence of people within the respective rooms.

Figure 7B:
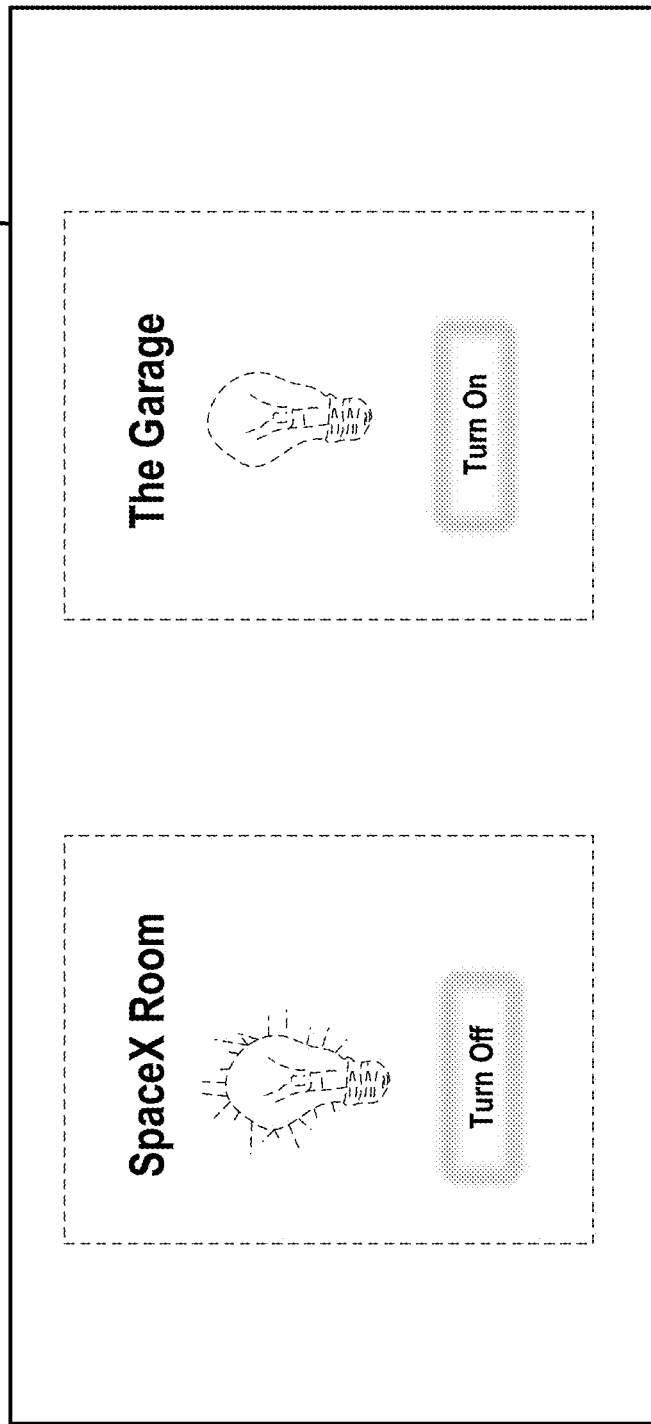
FIG. 7B depicts an exemplary lighting control graphical user interface, according to an embodiment.

The user may control the status of lighting within the building using the lighting control. For example, FIG. 7B depicts a lighting control GUI 720 that includes a light control application 724. The lighting control application 724 may include one or more lighting control buttons that when accessed by the user (e.g., via a mouse click, a touch screen panel, etc.) cause one or more electric light within a respective room to toggle on or off. For example, the lighting control buttons may each correspond to one of the rooms within the room presence information table 602. The lighting control buttons may include a graphical representation of a respective status. For example, a lighting control button may be illuminated or colored when turned on, and not illuminated/colored when turned off.

In some embodiments, the lighting within the rooms may be implemented using smart lighting (e.g., Phillips Hue lighting). The lighting controls may be integrated into the bot system described above, such that in some embodiments, the bot client module 124 receives a user command (e.g., "turn on lights in SpaceX Room"), analyzes the command to identify that the command includes an instruction ("turn on lights") and a parameter ("SpaceX Room"). The bot client module 124 may transmit the instruction and parameter to the lighting module 172 of the server 104. The lighting module 172 may include a set of computer-executable instructions for controlling lighting, and may perform an action to a particular set of lights based on the instruction and the parameter. The bot client module 124 may receive a response message from the lighting module 172 and display the response message to the user.

Exemplary Methods

Figure 8:
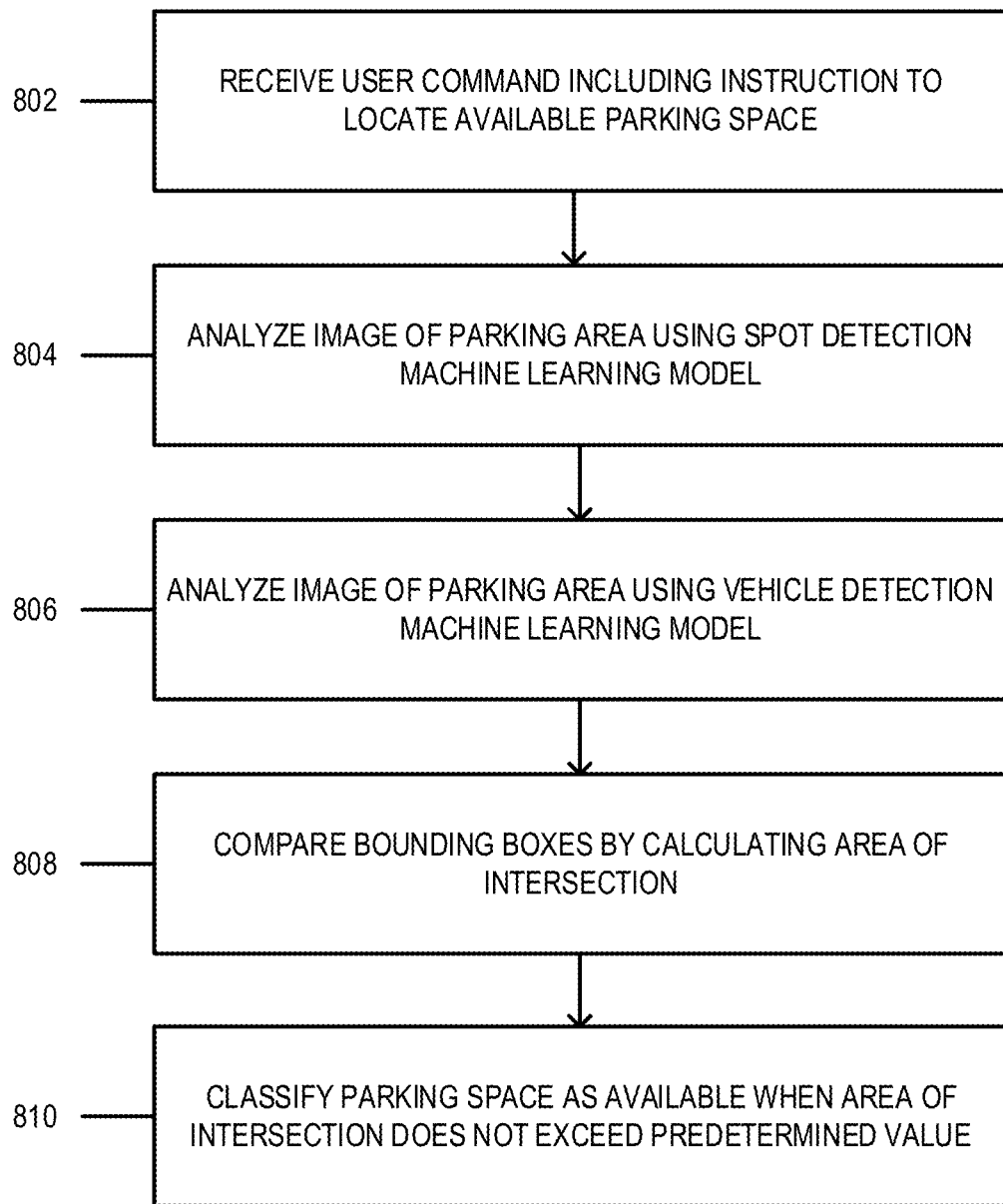
FIG. 8 depicts an exemplary computer-implemented method for performing building automation, according to an embodiment.

FIG. 8 depicts a flow diagram of an example method 800 for classifying a vehicle parking space. The method 800 may include receiving, in an input field of an application of a graphical user interface, a user command including an instruction to locate an available vehicle parking space (block 802). For example, the user command may be entered by a user into the input device 140 of FIG. 1. The GUI module 122 may include instructions for receiving the user command. The GUI module 122 may pass the user command to the bot module 124. The bot module 124 may process the user command to extract one or more instructions including one or more parameters. The bot module 124 may transmit the user command via the network 106 to the bot module 162. The bot module 162 may transmit a response to the user for display in the output device 142 by the GUI module 122. The application may be a building management bot application, such as the application 202 depicted in FIG. 2A. The input field of the application may correspond to the input field 574 of FIG. 5F, for example. The user may type a command such as the command 576, for example.

Concurrently, the bot module 124 may analyze the user command to determine the user's intent. A trained intent processing ML model may be used in some embodiments to determine the user intent. Based on the user's intent and/or the contents of the user command, the bot module 162 may access one or more of the modules 160. For example, the bot module 162 may pass the user command and/or one or more arguments of the user command to the ML module 178 for processing. For example, when the user command relates to finding an available vehicle parking space, the ML module 178 may analyze an image of a parking area using one or more trained ML model to identify one or more available parking spaces.

Specifically, the method 800 may include analyzing an image of a parking area (e.g., the parking area 550 of FIG. 5E) using a spot detection machine learning model to identify one or more parking space bounding boxes, each corresponding to a respective set of pixels (block 804). In some embodiments, the spot detection machine learning model includes analyzing the image of the parking area to identify one or more contours relating to a painted region of the parking space.

The method 800 may further include analyzing the image of the parking area using a vehicle detection machine learning model to identify one or more vehicle bounding boxes, each corresponding to a respective set of pixels (block 806). In some embodiments, the vehicle detection machine learning model may include analyzing the image of the parking area using a retina net configured to identify a vehicle type. The method 800 may include comparing each identified parking space bounding box to each vehicle bounding box by calculating the area of intersection of each parking space bounding box to each vehicle bounding box (block 808).

The method 800 may include, when the area of the intersection does not exceed a predetermined percentage value, classifying the parking space corresponding to the parking space bounding box as available (block 810). For example, the predetermined percentage value is 40%. In some embodiments, the predetermined percentage value may be determined by iteratively testing multiple percentage values to minimize a loss value. In some embodiments, the percentage value 40% may be determined using a separate ML model. The ML model may output an integer value from 0 to the number of spaces in the parking area, reflecting the number of available spaces. The ML model may also output an image of each space, in some embodiments, as depicted in exemplary output message 588-A and exemplary output message 588-B of FIG. 5G.

It should be appreciated that in some embodiments, a single ML model may be trained to locate parking spaces and/or vehicles. In some embodiments, other types of ML models may be used to identify available parking spaces. The ML module 178 may be used to train multiple models, wherein the respective models are trained to identify EV parking spaces, non-EV parking spaces, all parking spaces, etc.

Once the ML module 178 has analyzed the user command, the bot module 162 may receive output of the ML module 178. The bot module 162 may transmit a response to the user. For example, the method 800 may include transmitting a notification to a client computing device of a user, the notification including an identification of the available parking space, and displaying the notification in an output area of a bot graphical user interface of the client computing device, as depicted in FIG. 5G. It should be appreciated that the method 800 may include transmitting a notification that the lot is or has become full, as depicted respectively in FIG. 5F and FIG. 5G. As discussed herein, the results of the ML module may be stored in the database 190. Therefore, the status of the parking space may be tracked over time, and a first and second notification may refer to a single spot. For example, a first notification may identify an available space, and a second notification may identify that the space has become full. When the output of the ML module 178 indicates no available parking spaces, the method 800 may include displaying a list of nearby parking locations, such as the command output 530 of FIG. 5B.

Figure 9:
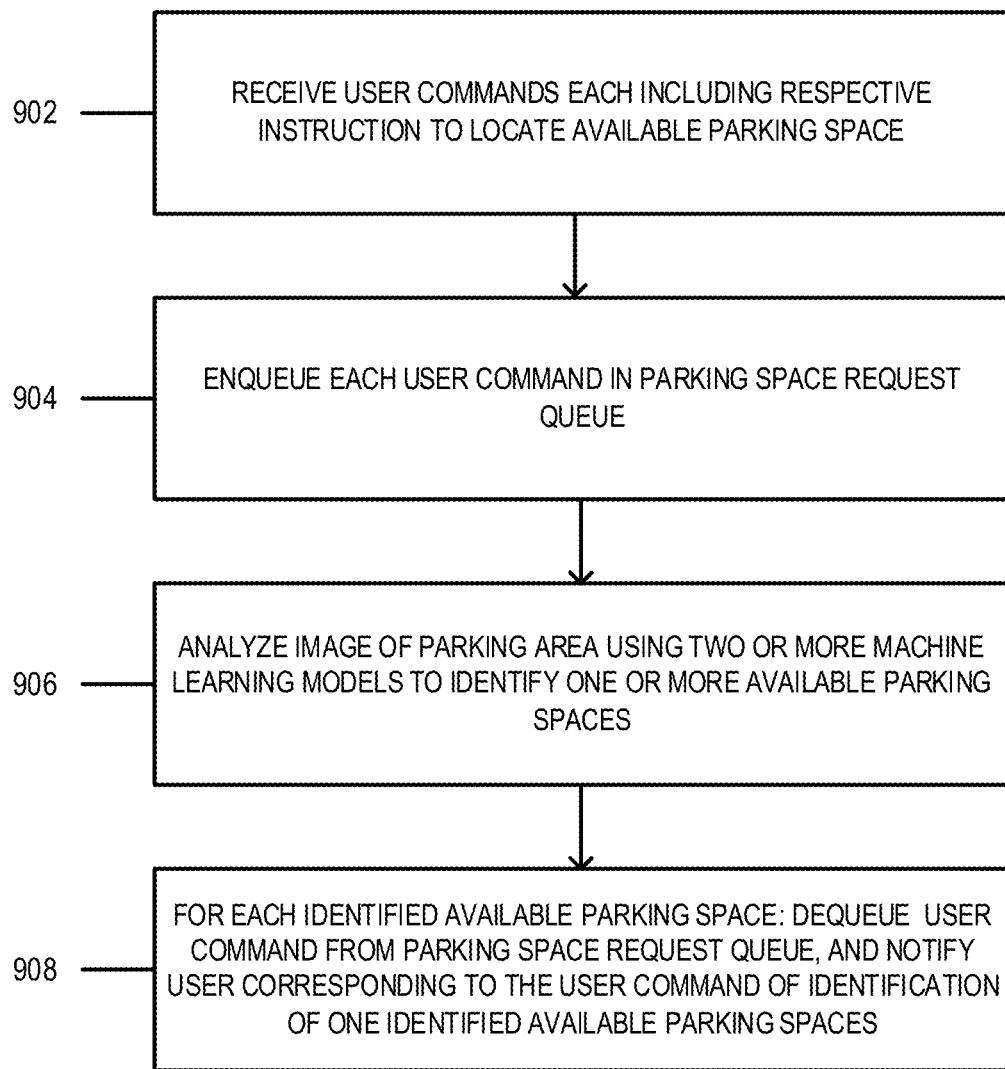
FIG. 9 depicts an exemplary computer-implemented method for dispatching available parking spaces to multiple users using an available parking spaces queue, according to an embodiment.

FIG. 9 depicts an exemplary method 900 for performing vehicle spot dispatch. The method 900 may include receiving a plurality of user commands each including a respective instruction to locate an available parking space (block 902). The method 900 may include enqueueing each user command in a parking space request queue (block 904). The method 900 may include analyzing an image of a parking area using two or more machine learning models to identify one or more available parking spaces (block 906). The method 900 may include, for each of the one or more identified available parking spaces: dequeueing a user command from the parking space request queue, and notifying the user corresponding to the user command of an identification of one of the identified available parking spaces (block 908).

In some embodiments, the method 900 may include for each of the user commands in the parking space request queue, automatically removing the user command when the user command is expired. In some embodiments, the parking space request queue is implemented as a FIFO queue. In some embodiments, the method 900 includes receiving user commands having a respective future time period (e.g., 2 PM tomorrow), and further includes updating an electronic calendar object based on each respective future time period. For example, the method 900 may reserve a parking spot of a user at the future time, as discussed herein.

The method 900 may include selecting the parking space request queue from a plurality of parking space request queues based on an attribute of the user. For example, the queue may be chosen based on the identity/affiliation of the user, the type of vehicle, the contents of the user command, an intent of the user detected using a trained ML model, etc.

Figure 10:
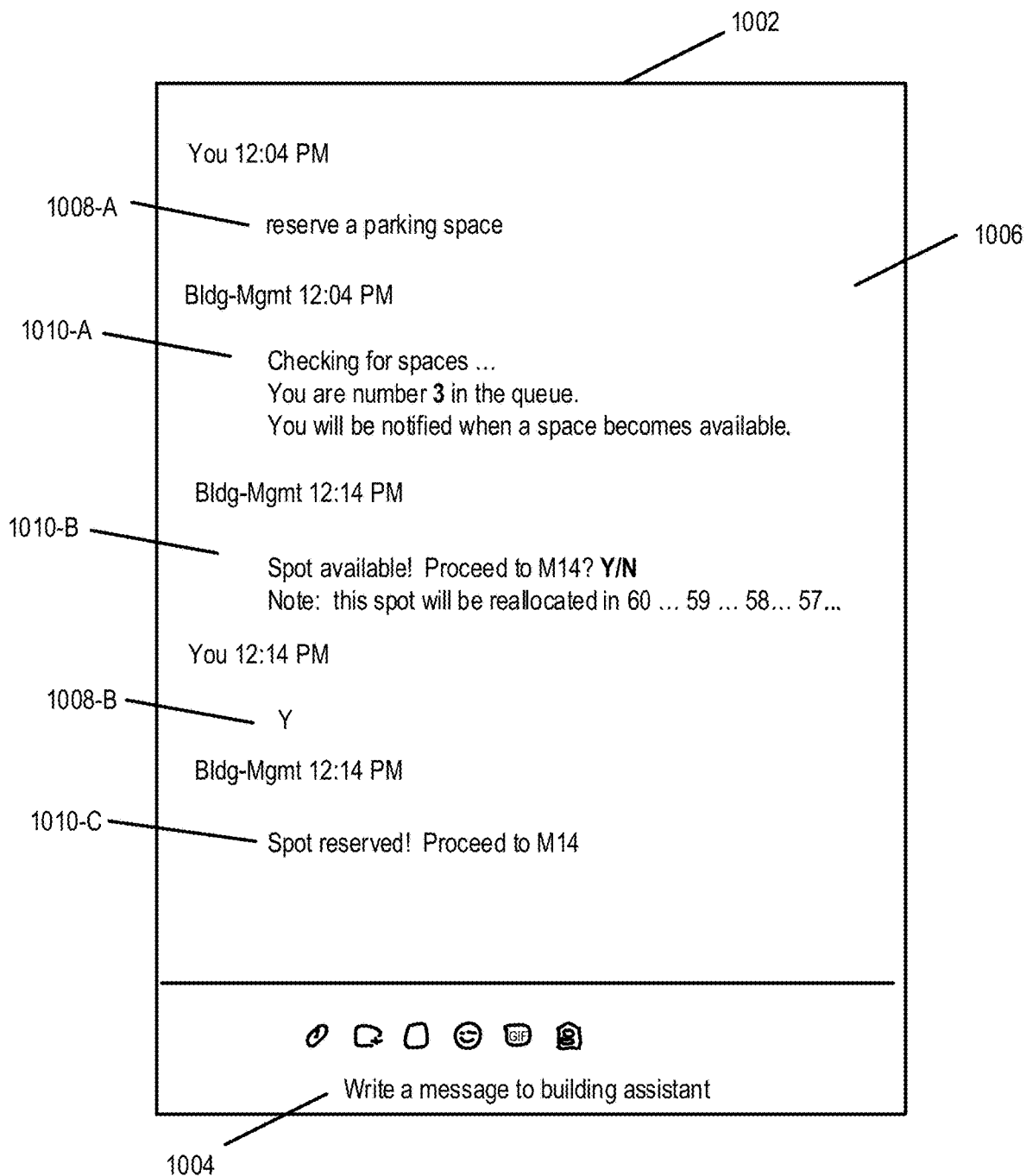
FIG. 10 depicts an exemplary spot dispatch graphical user interface including an application.

The method 900 may include searching parking space request queue to find the position of the user command corresponding to the user, and transmitting a notification to the user of the user's position in the parking space request queue. Transmitting the position of the user may notify the user that there are a number of people in the queue 590 ahead of the user, as shown in FIG. 10. In some embodiments, the user may have the option to submit a "cancel" command, removing the user command from the queue. The method 900 may include periodically analyzing the image of the parking area using the two or more machine learning models to identify the one or more available parking spaces. In this way, the present techniques support both on-demand available parking space dispatch, queued parking space dispatch and/or scheduled parking space dispatch.

Exemplary Vehicle Spot Dispatch Embodiment

FIG. 10 depicts an exemplary spot dispatch GUI 1000 including an application 1002. The application 1002 includes an input field 1004, and output area 1006 for displaying responses, user inputs 1008, and program outputs 1010. User input 1008-A corresponds to a user request to reserve a parking space. The user request may be received by the GUI 122 of the client 102, for example. As noted above, multiple client devices 102 may be operated simultaneously by multiple users (e.g., by 1024 or more concurrent users). The GUI 122 may transmit the user input 1008-A in a network request via the network 106 to the parking module 168, for example. The network request may include a user identifier and other metadata (e.g., a request time, a vehicle type/identifier, a tenant identifier, etc.). The parking module 168 may analyze the request and pass the request including one or more metadata element to the queueing module 180. The queueing module 180 may enqueue the request in one of the parking space request queues 590 based on the metadata. For example, when the request includes an EV vehicle type, the parking module 168 may pass the request to an EV parking space request queue 590.

The parking module 168 may include a queue item expiry in some embodiments. The queue item expiry may be a predetermined time value (e.g., a number of minutes) beyond which queue items expire. For example, the queueing module 180 may periodically analyze each element from the tail of the queue until an unexpired element is identified. For each expired element, the queueing module 180 may cause a notification to be transmitted to the user indicating that a spot could not be found. In some embodiments, the user command may include a queue item expiry override, such that the default expiry is replaced by the user-specified expiry. In this way, the user may indicate a willingness to wait longer than the default, or a need to find a parking space sooner.

In some embodiments, the present techniques support rich scheduling facilities. For example, the scheduling module 182 may maintain one or more electronic calendar objects (e.g., in the database 190). The GUI module 122 may include instructions for displaying a calendar in the output device 142. The user may access the calendar to select parking spaces in the future. An individual calendar may be displayed for each of a number of buildings managed by the environment 100. The user may create calendar entries corresponding to desired parking dates and times. For example, the user may create a calendar entry via the GUI 122 corresponding to parking at a particular building from 10:00 AM-11:00 AM on Tuesday. The user may create a calendar entry that recurs (e.g., once per week or at another interval).

In some embodiments, the GUI 122 may include instructions for accepting user calendar entry requests. In such embodiments, the GUI 122 may display the user's calendar entry using a style indicating that the request is not confirmed. The scheduling module 182 may receive entry requests including the metadata discussed above from the GUI 122 and analyze the one or more electronic calendar objects to determine whether to accommodate the user calendar entry request. The scheduling module 182 may include a set of computer-executable rules for approving user calendar entry requests. For example, a rule may specify that a user may claim one hour of parking per calendar day, but no more. Another rule, for example, may specify that a user may not park a non-electric vehicle in a vehicle parking space. It should be appreciated that many rules are envisioned.

In some embodiments, the user may access the calendaring functionality discussed above using bot commands to reserve parking spaces in the future. For example, in an embodiment, the user of FIG. 5F may enter a command such as, "check for open spaces tomorrow at 4 PM." The user command may be processed by the bot module 124 of FIG. 1. The bot module 124 may analyze the user command to determine a user intent. The user intent may be determined to correspond to a scheduling command. Based on determining that the command is a scheduling command, the command may be transmitted to the scheduling module 182 of FIG. 1. The scheduling module 182 may execute the rules discussed, create an entry in an electronic calendar object, and transmit a notification to the user indicating whether a spot is available.

Returning to FIG. 10, the application 1002 depicts a dialogue between the user seeking to reserve a parking space and the bot backend, in some embodiments. For example, the user input 1008-A indicates a user's initial space request. With respect to FIG. 1 and FIG. 10, the bot module 124 of FIG. 1 or the bot module 162 of FIG. 1 may analyze the user input 1008-A and determine the user's intent corresponds to seeking a parking space. The bot module 124 may transmit the user input 1008-A to the parking module 168, for example. The bot module 162 may transmit status messages (e.g., checking for spaces) to the client device 102 while concurrently receiving output from the machine learning module 178. For example, the bot module 162 may receive a queue count from the queueing module 180 and transmit the user's place in the queue to the user. For example, when the user is in the third position of a FIFO queue, as depicted (e.g., number 3 in the queue), the user would be at position 592-C of FIG. 5H. When the ML module 178 indicates no available spaces, the bot module 162 may notify the user that no spaces are available, as depicted. For example, program output 1010-A includes the status message, the queue count, and the no-availability message.

In some embodiments, the bot module 124 may continue to monitor the output of the ML module 178 periodically, and when the ML module 178 indicates the availability of an open space, the bot module 124 may transmit a message such as program output 1010-B to the user, wherein the user is solicited to provide an acceptance of the identified spot. The application 1002 may display a countdown, as depicted. When the user does not accept, or declines the spot, the bot module 124 may release the spot to another user by, for example, dequeueing another user from the queue 590. In the depicted example of FIG. 10, the user inputs an affirmative user input 1008-B. The bot module 124 may receive the affirmative user input 1008-B, and transmit a response to the user confirming that the spot has been reserved, as shown in program output 1010-C.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for smart building management using robot command and control, comprising:
    displaying, via a graphical user interface, a building automation bot client application including an input field, an output field and a plurality of channels, wherein one of the channels includes an active channel indicator,
    receiving, via the input field, bot input from a user,
    analyzing the bot input from the user using a trained machine learning model to identify a bot instruction and one or more bot parameters,
    generating an output by analyzing the bot instruction to identify a user intent and performing building automation task associated with the intent; and
    displaying the output in the output field of the building automation bot client application.

2. The computer-implemented method of claim 1, wherein receiving, via the input field, bot input from the user includes receiving a spoken user command.

3. The computer-implemented method of claim 1, further comprising:
    receiving, via the graphical user interface, a selection of the user corresponding to a new active channel in the plurality of channels; and
    updating the active channel indicator to correspond to the new active channel selection.

4. The computer-implemented method of claim 1, wherein the user intent relates to reserving a parking space, and further comprising:
    in response to the bot instruction, analyzing an image of a parking area using one or more trained machine learning model to identify one or more available parking space.

5. The computer-implemented method of claim 1, wherein the user intent corresponds to one or more of user authentication, an e-receptionist or kiosk-based user check in, determining a room presence, a lighting control or a report.

6. The computer-implemented method of claim 1, wherein the output includes a boolean question relating to a bot action, and further comprising:
    receiving, in response to the boolean question, a user response via the input field; and
    analyzing the user response and, when the response to the boolean question is a positive response, performing a bot action.

7. The computer-implemented method of claim 1, wherein the bot instruction corresponds to locating an electric vehicle charging location, and the one or more bot parameters include a port type and a mileage radius.

8. A smart building management system comprising:
    one or more processors; and
    a memory storing instructions that, when executed by the one or more processors, cause the system to:
    display, via a graphical user interface, a building automation bot client application including an input field, an output field and a plurality of channels, wherein one of the channels includes an active channel indicator,
    receive, via the input field, bot input from a user,
    analyze the bot input from the user using a trained machine learning model to identify a bot instruction and one or more bot parameters,
    generate an output by analyzing the bot instruction to identify a user intent and performing building automation task associated with the intent; and
    display the output in the output field of the building automation bot client application.

9. The smart building management system of claim 8, the memory storing further instructions that when executed cause the system to:
    receive a spoken user command.

10. The smart building management system of claim 8, the memory storing further instructions that when executed cause the system to:

receive, via the graphical user interface, a selection of the user corresponding to a new active channel in the plurality of channels; and update the active channel indicator to correspond to the new active channel selection.

11. The smart building management system of claim 8, the memory storing further instructions that when executed cause the system to:

in response to the bot instruction, analyze an image of a parking area using one or more trained machine learning model to identify one or more available parking space.

12. The smart building management system of claim 8, the memory storing further instructions that when executed cause the system to:

receive the user intent corresponding to one or more of user authentication, an e-receptionist or kiosk-based user check in, determining a room presence, a lighting control or a report the bot action.

13. The smart building management system of claim 8, the memory storing further instructions that when executed cause the system to:

receive, in response to a boolean question, a user response via the input field; and analyze the user response and, when the response to the boolean question is a positive response, performing a bot action.

14. The smart building management system of claim 8, the memory storing further instructions that when executed cause the system to:

receive a bot instruction corresponding to locating an electric vehicle charging location, and one or more bot parameters including a port type and a mileage radius.

15. A non-transitory computer readable medium containing program instructions that when executed, cause a computer to:

display, via a graphical user interface, a building automation bot client application including an input field, an output field and a plurality of channels, wherein one of the channels includes an active channel indicator, receive, via the input field, bot input from a user, analyze the bot input from the user using a trained machine learning model to identify a bot instruction and one or more bot parameters, generate an output by analyzing the bot instruction to identify a user intent and performing building automation task associated with the intent; and display the output in the output field of the building automation bot client application.

16. The non-transitory computer readable medium of claim 15, including further program instructions that when executed, cause a computer to:

receive a spoken user command.

17. The non-transitory computer readable medium of claim 15, including further program instructions that when executed, cause a computer to:

receive, via the graphical user interface, a selection of the user corresponding to a new active channel in the plurality of channels; and update the active channel indicator to correspond to the new active channel selection.

18. The non-transitory computer readable medium of claim 15, including further program instructions that when executed, cause a computer to:

in response to the bot instruction, analyze an image of a parking area using one or more trained machine learning model to identify one or more available parking space.

19. The non-transitory computer readable medium of claim 15, including further program instructions that when executed, cause a computer to:

receive the user intent corresponding to one or more of user authentication, an e-receptionist or kiosk-based user check in, determining a room presence, a lighting control or a report.

20. The non-transitory computer readable medium of claim 15, including further program instructions that when executed, cause a computer to:

receive, in response to a boolean question, a user response via the input field; and analyze the user response and, when the response to the boolean question is a positive response, performing a bot action.

* * * * *